United States Patent [19]
Elpern

[11] 4,446,837
[45] May 8, 1984

[54] PRESSURE REGULATOR-ACCUMULATOR FOR USE WITH MECHANICAL DIAPHRAGM PUMP

[75] Inventor: David G. Elpern, Hamtramck, Mich.

[73] Assignee: The Bendix Corporation, Southfield, Mich.

[21] Appl. No.: 27,707

[22] Filed: Apr. 9, 1979

Related U.S. Application Data

[63] Continuation of Ser. No. 781,263, Mar. 25, 1977, abandoned.

[51] Int. Cl.³ .............................................. F02M 69/00
[52] U.S. Cl. ...................................... 123/460; 123/461; 123/470
[58] Field of Search ...... 123/119 R, 139 AF, 139 AV, 123/139 AS, 136, 139 AW, 460, 461, 470; 261/36 A

[56] References Cited

U.S. PATENT DOCUMENTS

| | | | |
|---|---|---|---|
| 2,918,046 | 12/1959 | Teagarden | 123/119 R |
| 3,039,485 | 6/1962 | Brohl | 123/136 |
| 3,061,286 | 10/1962 | Mennesson | 261/36 A |
| 3,118,009 | 1/1964 | Phillips | 123/119 R |
| 3,181,843 | 5/1965 | Brown et al. | 123/119 R |
| 3,724,435 | 4/1973 | Bier | 123/139 AV |
| 3,738,622 | 6/1973 | Tuckey | 261/36 A |
| 3,931,814 | 1/1976 | Rivere | 123/139 AW |

Primary Examiner—Andrew M. Dolinar
Attorney, Agent, or Firm—Russel C. Wells; Gaylord P. Haas

[57] ABSTRACT

A single point fuel injection system for an internal combustion engine including a throttle body having first and second air intake throats corresponding to first and second intake manifold planes of the engine, the air flow through each throat being controlled by throttle plates positioned within each throat. The throttle body further includes a fuel accumulating bowl which is integrally formed with the throttle body, the bowl being enclosed by a diaphragm and cover member. Within the enclosure of the fuel bowl are positioned a pair of injectors which are adapted to inject pulsed portions of fuel through a sonic nozzle and into the air intake throat of the throttle body. The injection of pulses of fuel into the throat is timed in accordance with the sensing of the crankshaft reaching a position of 15° before top dead center to enhance the distribution of fuel charge from cylinder to cylinder. The fuel pressure within the bowl is controlled by a pressure regulator positioned within the enclosure formed by the bowl and housing cover, the diaphragm closing the bowl also forming the diaphragm for the regulator. The pulses to the injectors are controlled by an electronic control unit in response to sensed engine conditions.

10 Claims, 23 Drawing Figures

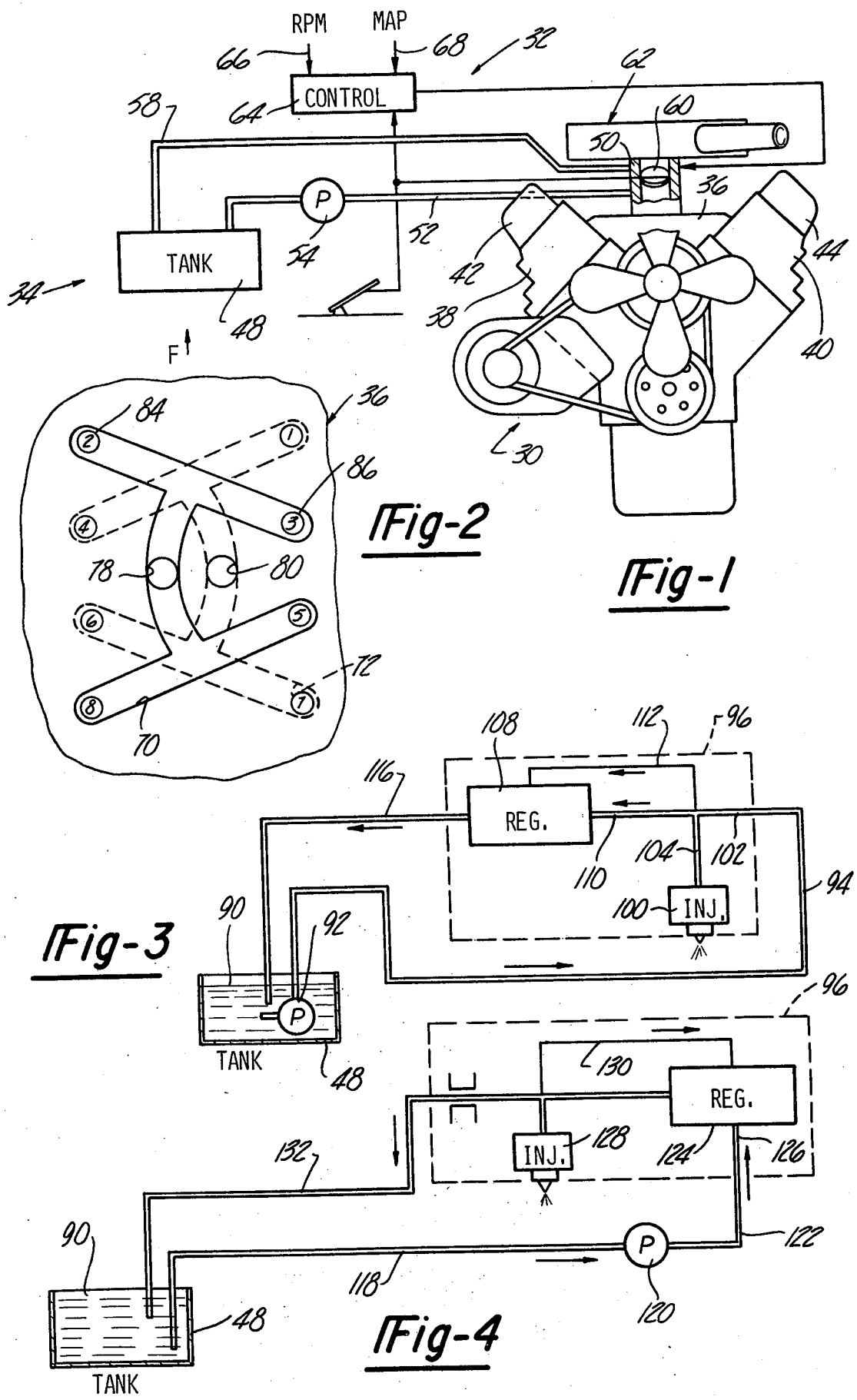

Fig-15
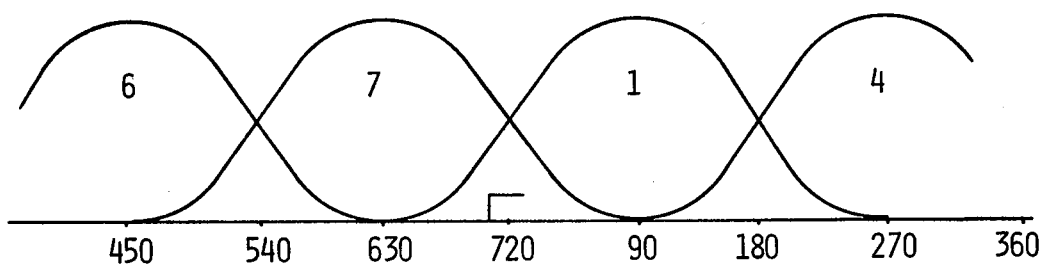
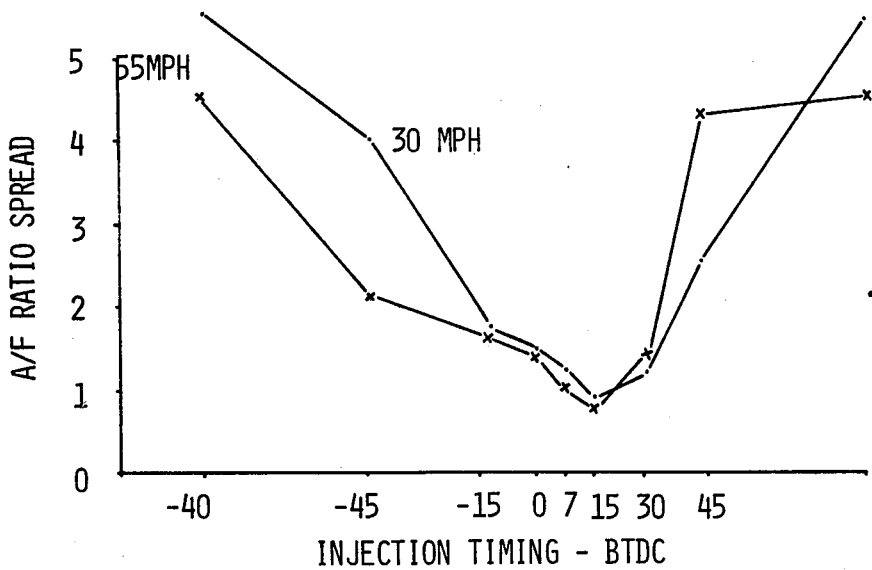
Fig-16
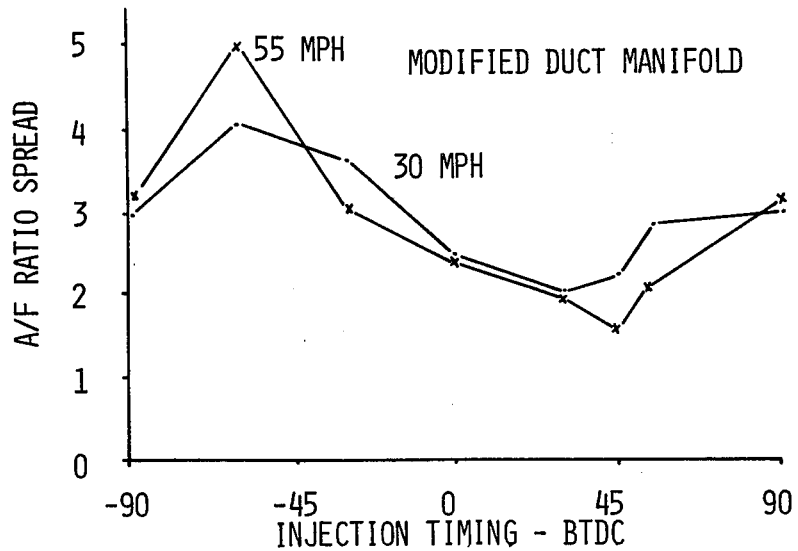
Fig-17

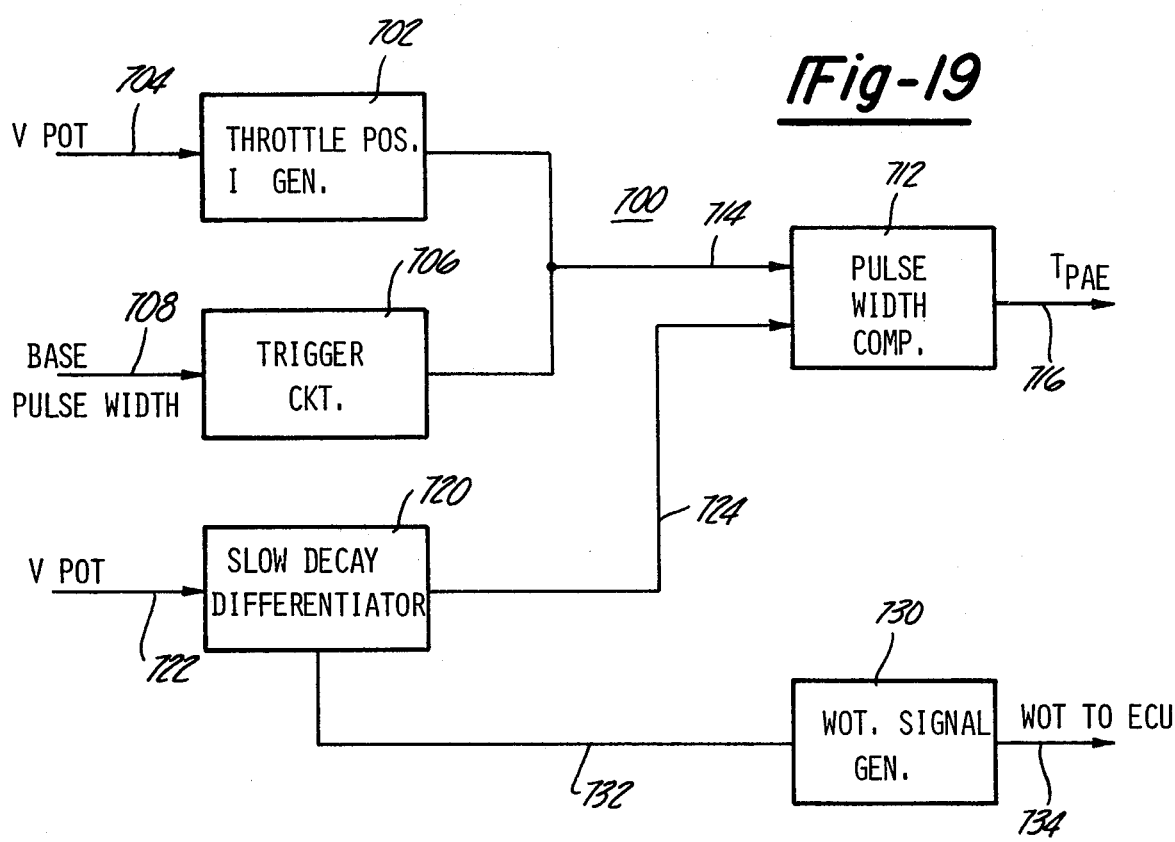
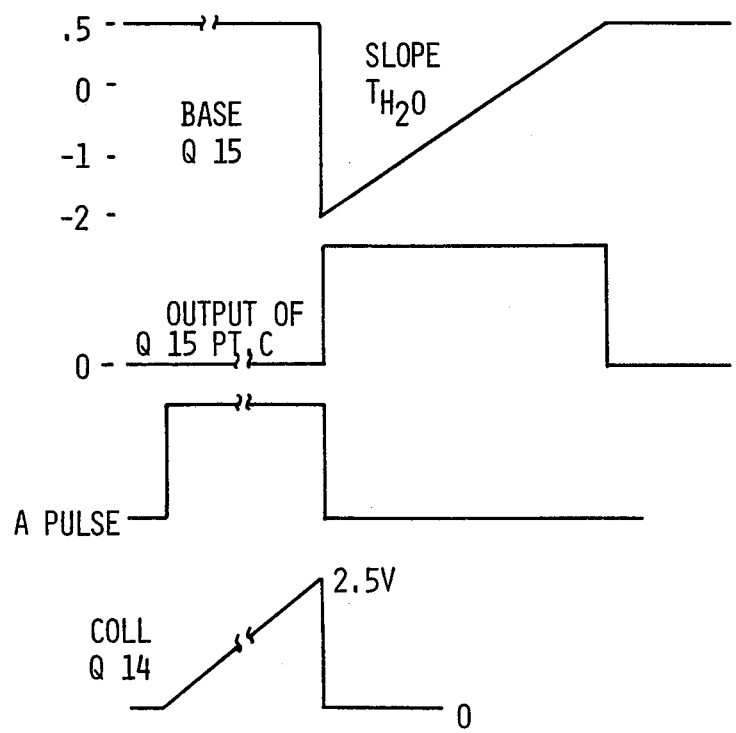

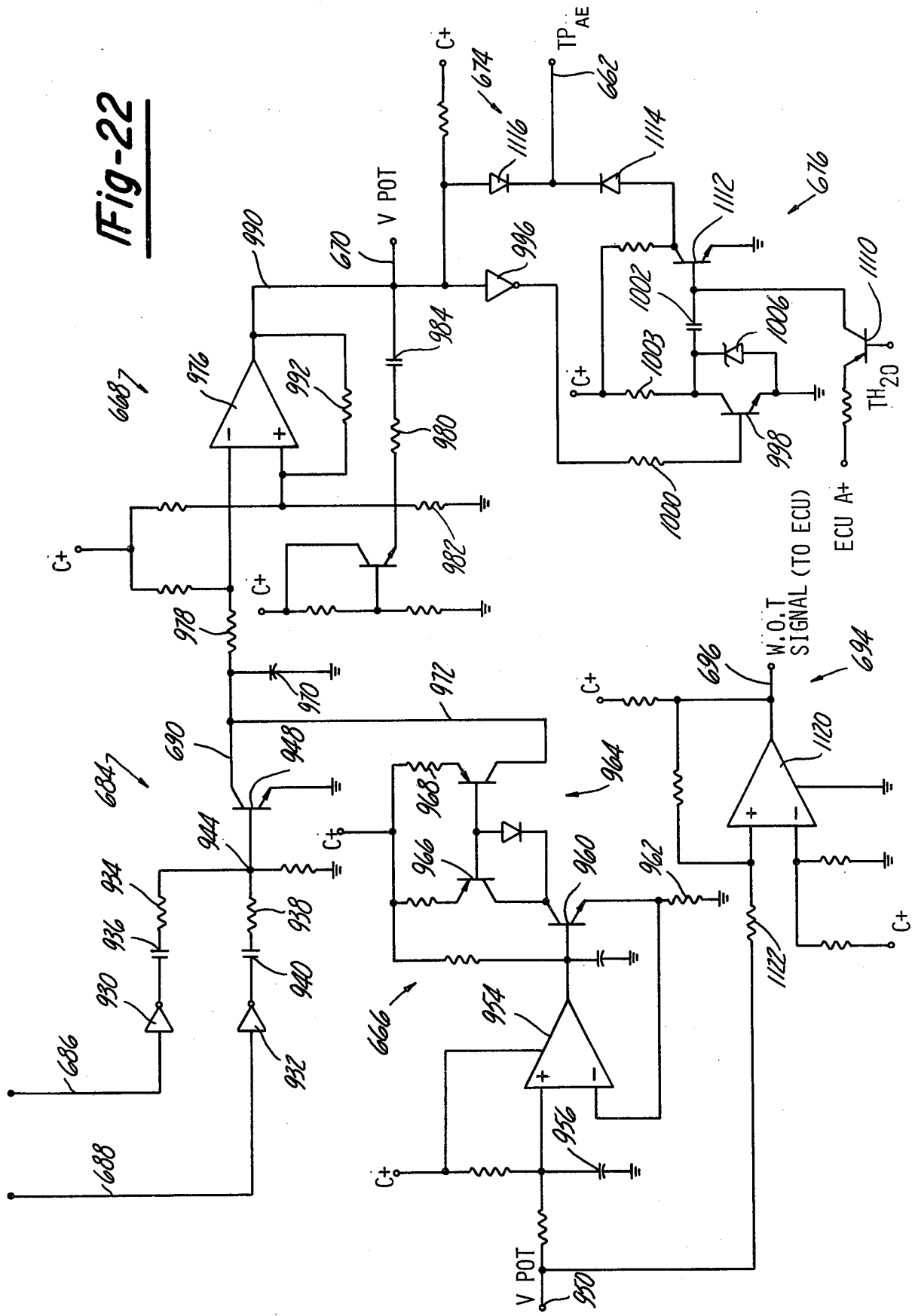

PRESSURE REGULATOR-ACCUMULATOR FOR USE WITH MECHANICAL DIAPHRAGM PUMP

This is a continuation of application Ser. No. 781,263, filed Mar. 25, 1977, now abandoned.

BACKGROUND AND SUMMARY OF THE DISCLOSURE

This invention relates generally to a single point fuel injection system and, more particularly, to the mechanical, electromechanical and electronic portions of a fuel management system for delivering a charge of fuel to a specified opening intake valve of the engine from a single point in a throttle body.

The majority of automobiles being built today have fuel systems which are either controlled by means of a carburetor or a multipoint fuel injection system. While the multipoint fuel injection system has been found to be an improvement over the carburetor, it too has problems which require solution. The system being described herein is calculated to combine the advantages of both systems and either solve or ameliorate the inherent problems of the two systems.

In the case of a carburetor, while it has an advantage of low cost and low operating fuel pressure, there are many undesirable characteristics inherent to the use of a carburetor. For example, the operation of a carburetor provides a continuous flow of fuel, the quantity of fuel being determined by the position of the throttle. It has been found that the fuel is not properly atomized and entrained in the air flow through the throat of the carburetor. Without proper atomization, the fuel distribution to the various cylinders is uneven thereby causing a rich or lean mixture from one cylinder to another. This situation increases the objectionable emissions from the particular cylinder which is too rich or too lean relative to stoichiometric. Also, relative to a fuel injection system, the carbureted system is inherently inaccurate in its fuel control whereby all of the cylinders may be operating at a point different from optimum.

Further, carbureted systems are typically operated in an open loop mode of operation. With this type of operation, the output of the engine exhaust system is not sensed to determine the quality of combustion which is occuring in the engine. Under these circumstances, the optimum air/fuel ratio is not achieved and higher emission levels are again experienced.

The shortcomings of a carbureted system have been somewhat eliminated by certain multipoint fuel injection systems on the market. With a multipoint fuel injection system, the fuel management is provided with a rather precise control of the fuel being fed to the engine which results in improved driveability without unwanted surges, lower emission levels, convenient changes of the calibration of the system, and the system may be operated in a closed loop mode of operation.

However, multipoint fuel injection systems do have certain undesirable characteristics which, if overcome, would increase the use of injected fuel management systems. For example, a typical multipoint fuel injection system involves a higher cost in the initial installation due to the sophisticated injectors being utilized and the relatively higher cost for the control electronics. Also, due to the requirement of a precise fuel pulse being fed to each cylinder, the fuel distribution between cylinders may vary due to the fact that the injectors are not perfectly matched, one to the other. As is the case with a carburetor, unless the fuel is highly atomized and rapidly carried into the appropriate cylinder immediately upon injection of fuel into the air stream, wall wetting is experienced. In the situation where the wetting of the walls with fuel is occurring, fuel is unevenly distributed to the cylinders and results in an uneven air/fuel ratio from cylinder to cylinder. Also, with wall wetting, the fuel charge being fed to the same cylinder from one cycle to the next may vary depending on the amount of fuel on the walls of the manifold. Upon injection of a fuel pulse which wets the walls of the manifold, the cylinder will receive a leaner air/fuel ratio charge than required. Subsequently, the fuel on the walls of the manifold will be entrained into the air stream to create a rich air/fuel mixture, which air/fuel mixture is not directly controlled by the duration of the fuel injection pulse. This can result in power surges which deteriorates the driveability of the automobile.

With a multipoint system, there are problems involved in the hot starting of the automobile and hot fuel handling due to the fact that the injectors are positioned very close to the high heat areas of the engine, as are the fuel lines feeding the injectors. This creates vaporization of the fuel resulting in a low quantity of fuel being injected per pulse to create a lean air/fuel ratio. Further, the multipoint fuel injection system requires a high pressure fuel system with the inherent sealing problems and the cost of a high pressure pump.

With a multipoint fuel injection system, it is seen that an injector is provided for each cylinder of the engine thereby requiring a wholly self-contained injector at each cylinder. Further, the system requires a pressure regulator which is separate from the injectors and a plurality of fuel atomizers, one for each injector being utilized in the system. It is obviously desirable to integrate all of the various parts associated with a multipoint fuel injection system into a single unit having a single housing. This reduces the cost of the system and also increases reliability.

Brief Description of the Disclosure

The system disclosed herein is calculated to combine the desirable features of both the carburetor and multipoint fuel injection systems while eliminating the problem areas of both systems to the extent possible.

The fuel management system disclosed herein takes advantage of the manifold design inherent in automotive engines being produced today. In a carbureted system, the manifold is designed such that the volume of air between the point of introduction of a fuel charge and the intake valve is equal for all cylinders to maintain a substantially equal distribution of air/fuel to each cylinder. Also, in carbureted systems presently being utilized, an eight cylinder engine has the intake manifold devised in a dual plane whereby four of the cylinders are fed from a first throat of the carburetor and the remaining four cylinders are fed from a second throat. Further, in certain engines, the manifold volume described above which exists between the point of introduction of a fuel charge into the throttle body to the inlet valve for a particular cylinder is less than the volume of that particular cylinder. In one typical engine, the volume of air between the point of introduction of fuel at the throat and the inlet valve is 33 cubic inches while the volume of any one cylinder in the engine is 44 cubic inches. With the configuration, the volume of air between the throttle throat and an opening intake valve, assuming all the remaining valves are effectively closed within that manifold plane, will be entirely moved into the cylinder which is on the intake portion of the cycle, and additional air will be introduced from the atmosphere to make up the remaining volume required to fill the cylinder.

When the next valve open within that manifold plane, the volume of air between the point of introduction of fuel and the opening inlet valve will be moved into that cylinder in its entirety and further make-up air will be added. It has been found that a charge of fuel injected at the proper time relative to the opening point of the intake valve will be moved to a specific cylinder, and the additional make-up air will be introduced to the cylinder after the fuel charge has entered the cylinder. In this way, all of the fuel of any particular injection pulse will be moved into a cylinder, minimizing wall wetting of the manifold. The system, except for the intake portion of the engine cycle, will contain dry air until the next time a pulse of fuel is injected into the fuel intake portion of the system. Further, the fuel is injected at the last possible moment to take advantage of the latest sensed engine performance characteristic information. Also, no heating is necessary to evaporate fuel.

The system of the present invention includes a throttle body having one or more throats formed therein, the number of throats corresponding to the number of manifold planes which exist in the intake manifold of the engine. As is conventional, the air flowing through the throats is controlled by a throttle plate mounted in the throat, the opening of which is controlled by the driver. There is also formed in the throttle body a cavity which forms the fuel bowl for introducing fuel into the throats of the throttle body. The control of fuel from the fuel bowl to the throttle body throat is controlled by a single fuel injector per throat, the fuel injector being pulsed in accordance with a preselected timing scheme by means of an electronic control unit.

The electronic control unit is a modification of an electronic control unit presently being sold by The Bendix Corporation and designated ECU II-1 or ECU II-1A and bear Bendix part numbers 1611188 to 1611191 and an altitude compensated version bearing Bendix part number 1612079. The modifications to this electronic control unit to meet the objects of the present fuel management scheme will be described in conjunction with the description of FIGS. 18–23.

As stated above, it is very important that the fuel being introduced to the throat of the throttle body for any given plane of manifolding be extremely finely atomized to enable a rapid transporting of the fuel charge to the particular inlet valve which is in the opening mode. In this way, the probability is maximized that the any entire fuel charge is introduced to the cylinder corresponding to the opening intake valve and the probability is minimized that any fuel will remain in the manifold after the valve closes.

In accordance with the concepts of the present invention, the peferred form of injection assembly includes a fuel injector and sonic nozzle, the injector introducing a pulse of fuel into the sonic nozzle, the sonic nozzle being interposed between the fuel injector and the throttle body throat. Air passages are provided for the sonic nozzle to enable air to be introduced at the inlet end of the sonic nozzle in response to a reduction of manifold pressure at the exit point of the nozzle during the operation of the automobile engine.

The sonic nozzle has been devised to maintain the air flowing through the sonic nozzle or venturi at sonic velocity throughout the major portion of the engine operating range. It has been found that the sonic velocity is maintained with the configuration of the sonic nozzle disclosed herein down to a manifold pressure of 4 inches of mercury vacuum. However, even without sonic velocities, it has been found that atomization of the fuel is adequate to ensure movement of the fuel charge to the opening inlet valve at approximately 1 inch of manifold vacuum. At certain other operations of the engine, for example extremely low engine speeds and wide open throttle conditions, certain modifications to the system may be incorporated to ensure that sufficient atomization of the fuel occurs. For example, screens or baffles may be introduced in the throat in the path of the fuel charge, or the nozzle of the venturi could be extended further into the throat than the distance disclosed in the drawings associated with this specification, or the venturi of the sonic nozzle could be bent to redirect the fuel flow down into the manifold.

As will be seen from the detailed description of the system disclosed herein, the throttle body includes a fuel bowl and an upper cover is attached thereto to form an enclosed space into which fuel is introduced and the major portion of the mechanical and electromechanical portion of the fuel management system is housed. The enclosed space is adapted to house the fuel injectors and a pessure regulator, the pressure regulator being one of two different types, either a bypass metering type or an inlet metering type.

With respect to the inlet metering type, the diaphragm of the pressure regulator, in conjunction with the volume of the fuel bowl between the pressure regulator diaphragm and the bottom of the fuel bowl, acts as an accumulator whereby fuel is pumped into the bowl under pressure during the discharge portion of the pump cycle and fuel is not pumped into the bowl during the intake portion of the pump cycle. During this intake portion of the pump cycle, the fuel injectors are still being pulsed to cause fuel to be introduced into the throttle body throat and, as will be seen, fuel is also being returned to the tank for venting purposes. Accordingly, the fuel supply within the bowl is being depleted, which depletion would have a tendency to decease the pressure within the fuel bowl. However, the biasing spring of the pressure regulator causes the diaphragm to move downwardly and thereby compress the fuel and maintain a constant fuel pressure during the intake stroke of the fuel pump.

As noted above, with either pressure regulator disclosed herein, it has been found that any vaporization of the fuel in the fuel bowl is easily vented by means of a vent tube formed within the throttle body. The particular construction of the injector valve itself is devised to be generally open, thereby permitting any fuel vaporization formed in the area of the injector to float to the top of the fuel bowl in the form of bubbles, the bubbles then being vented to the fuel tank. This arrangement enhances the hot fuel handling properties of the system.

As to the general details of a preferred form of injector assembly, the injector assembly is fabricated from a frame member which is adapted to generally enclose and retain a ball valve assembly relative to the valve orifice, and the frame also fixes the electromagnetic portion of the injector valve relative to the ball valve assembly. The electromagnetic portion of the injector includes a generally C-shaped ferrous core which is attached to the frame member, one leg of the C-shaped core having a coil bobbin concentric therewith. The open end of the C-shaped core is provided with a generally flat armature interconnected with the ball valve assembly to actuate the ball valve assembly, thereby controlling the flow through the valve orifice.

The above-described assembly has been found to be extremely simple to manufacture and reliable in operation, and, through its open configuration, minimizes the prospects of vaporized fuel from being injected into the sonic air stream associated with the sonic venturi.

As will be seen from a reading of the detailed description of the fuel management system disclosed herein, the electronic control unit will produce, for an eight cylinder engine, eight pulses per engine cycle. Thus, the injectors will be pulsed 4 times per engine revolution, or 8 times per engine cycle. In this way, an injector will be pulsed once for each opening of an intake valve on the intake portion of the cycle. Through testing, it has been found that the ideal point for injecting fuel into the sonic nozzle occurs at 15° before top dead center of each cylinder as it sequentially goes into the intake portion of the engine cycle. By pulsing an injector at 15° before top dead center, and every 90° thereafter for an eight cylinder engine, the fuel distribution to each cylinder is maintained within one air/fuel ratio of every other cylinder of the engine. Thus, the problems inherent in uneven air/fuel ratio distribution from cylinder to cylinder are alleviated. The above noted timing is a typical example, and the optimum timing varies for different engine and manifold design.

As noted above, the pulse generating circuitry, characterized an electronic control unit, is a standard electronic control unit produced by The Bendix Corporation with slight modifications. The above-noted standard electronic control unit is utilized in conjunction with a multipoint injection system wherein the injectors are divided into two groups of four injectors per group for an eight cylinder engine. Accordingly, each bank of injectors are pulsed once per engine cycle and the electronic control unit must produce one output pulse per engine revolution. In this situation, the duration of the output pulse can be extended by the electronic control unit to 360° or an entire engine revolution. With the system of the present invention however, the electronic control unit must produce 4 pulses per engine revolution. Thus, the duration of each of the output pulses is limited to a maximum of 90° of an engine revolution. It is felt that this is insufficient to provide sufficient pulse duration latitude and thus fuel control.

Accordingly, the standard electronic control unit is modified by calibrating the standard electronic control unit pulse or base pulse duration by one half, in the preferred embodiment. It is to be understood that division by other multiples could be utilized. The output pulse of the electronic control unit is then fed to a modification circuit which multiplies the injector pulse to provide the control for the injector itself. In this way, the duration of the output pulse from the electronic control unit can be up to one half or 180° of an engine revolution.

The modified electronic control unit also includes a transient decay function circuit which provides a transient decay for an acceleration enrichment pulse which is added to the base pulse in the situation where acceleration enrichment is needed. The transient decay function circuit provides a transient decay for the acceleration enrichment pulse in response to a rate of change of throttle position.

OBJECTS AND BRIEF DESCRIPTION OF THE DRAWINGS

Accordingly, it is one object of the present invention to provide an improved fuel management system for use in connection with an internal combustion engine.

It is another object of the present invention to provide an improved fuel injection system for use in connection with a single point fuel management control system.

It is a further object of the present invention to provide a fuel management control system which has improved fuel atomization characteristics.

It is still a further object of the present invention to provide an improved fuel management system incorporating the advantageous features of both a carburetion system and a fuel injection system for an internal combustion engine.

It is still another object of the present invention to provide an improved fuel management system which minimizes the fuel distribution differential between cylinders of a multicylinder internal combustion engine.

It is still a further object of the present invention to provide an improved fuel management system which decreases the wall wetting characteristics of previous fuel management systems.

It is still a further object of the present invention to provide an improved management system which ameliorates the hot start problems heretofore experience in internal combustion engines.

It is still another object of the present invention to provide improved hot fuel handling characteristics in a fuel management system for an internal combustion engine.

It is a further object of the present invention to provide fuel management system of the injection type which utilizes a low pressure fuel system.

It is still a further object of the present invention to provide an improved fuel management system which utilizes the desirable driveability characteristics of a multipoint fuel injection system while utilizing a single point introduction of fuel to the system.

It is still a further object of the present invention to improve the emission levels of an internal combustion engine over and above those experienced in a carbureted system while maintaining a single point introduction of fuel to the system.

It is still a further object of the present invention to provide an improved single point fuel management system which has the capability of convenience in altering the base calibration of the fuel introduction system.

It is a further object of the present invention to provide an improved fuel management system in which the fuel charge introduced to the fuel system of an internal combustion engine can be accurately predicted as to the final destination cylinder of that fuel charge.

It is a further object of the present invention to provide an improved fuel management system which minimizes the number of parts required for an effective system.

It is a further object of the present invention to provide an improved injector for a fuel management system of an internal combustion engine.

It is another object of the present invention to provide an improved fuel injection and atomization assembly for a fuel injection system in an internal combustion engine.

It is still a further object of the present invention to provide an improved vapor purge system for use in conjunction with a fuel management system in an internal combustion engine.

It is still another object of the present invention to provide an improved fuel injector which is capable of being submerged in the fuel being controlled.

It is another object of the present invention to provide fuel vaporization by improved atomization without the necessity of external heat.

It is still another object of the present invention to provide an improved combination of a fuel injector and fuel regulator for use in connection with a fuel management system in an internal combustion engine.

It is still another object of the present invention to provide an improved bypass type regulator for use in conjunction with a fuel injection system in an internal combustion engine.

It is still another object of the present invention to provide an improved fuel accumulator assembly for use in conjunction with the fuel management system of an internal combustion engine.

It is still a further object of the present invention to provide an improved injector for a fuel injection system having low cost and high reliability characteristics.

It is still a further object of the present invention to provide an improved sonic fuel injection assembly for use in a fuel management system of an internal combustion engine.

It is still a further object of the present invention to provide an improved manifold/fuel injection combination for use in connection with a fuel management system of an internal combustion system.

It is still a further object of the present invention to provide an improved system for timing the injection of fuel pulses into the intake manifold of an internal combustion engine.

It is still another object of the present invention to provide an improved electronic control unit for use in conjunction with a fuel injection system in an internal combustion engine.

It is still another object of the present invention to provide an improved electronic control unit for use in conjunction with a fuel injection system of an internal combustion engine whereby the duration of the injection pulses may be increased beyond the time between subsequent pulses generated by the electronic control unit.

It is still a further object of the present invention to provide an improved acceleration enrichment control law for a fuel injection system by adding an acceleration enrichment pulse contiguous with the end of the normal injection pulse or the end of the base pulse.

It is still a further object of the present invention to provide an improved acceleration enrichment control by utilizing a transient decay function in generating the acceleration enrichment pulses.

It is a further object of the present invention to provide an improved fuel injection system which is inexpensive to manufacture, reliable in operation and compact in useage.

Further objects, features and advantages of the system of the present invention will be become readily apparent from a reading of the following specification and a consideration of the attached drawings in which:

FIG. 1 is a schematic diagram of an engine and fuel management system incorporating certain features of the present invention;

FIG. 2 is a diagrammetic representation of the intake manifold of an eight cylinder engine wherein the manifold is divided into two planes of four cylinders per plane;

FIG. 3 is a schematic diagram illustrating one form of fuel regulation for use in conjunction with the fuel management system of the present invention;

FIG. 4 is a schematic diagram illustrating another form of fuel pressure regulation which may be adaptable for use in conjunction with the system of the present invention;

FIG. 15 is a timing diagram illustrating the relationship of the rise of the intake valves for four of the cylinders of an eight cylinder engine relative to engine rotation and also correlating the start of the injector pulse relative to top dead center;

FIG. 16 is a diagram illustrating the effect of injection timing an air/fuel ratio distribution from cylinder to cylinder for two engine speeds;

FIG. 17 is a diagram similar to that illustrated in FIG. 16 but illustrating the effect of injection timing on distribution of the air/fuel ratio from cylinder to cylinder for a modified manifold engine;

FIG. 19 is a block diagram illustrating the details of a modification to the circuit diagram of FIG. 18;

FIG. 21 is a timing diagram illustrating the relationship of certain signals generated in the circuit of FIG. 20;

FIG. 22 is a schematic diagram illustrating the remaining electronic details of the block diagram of FIG. 18.

DETAILED DESCRIPTION OF THE DRAWINGS

Figure 5:
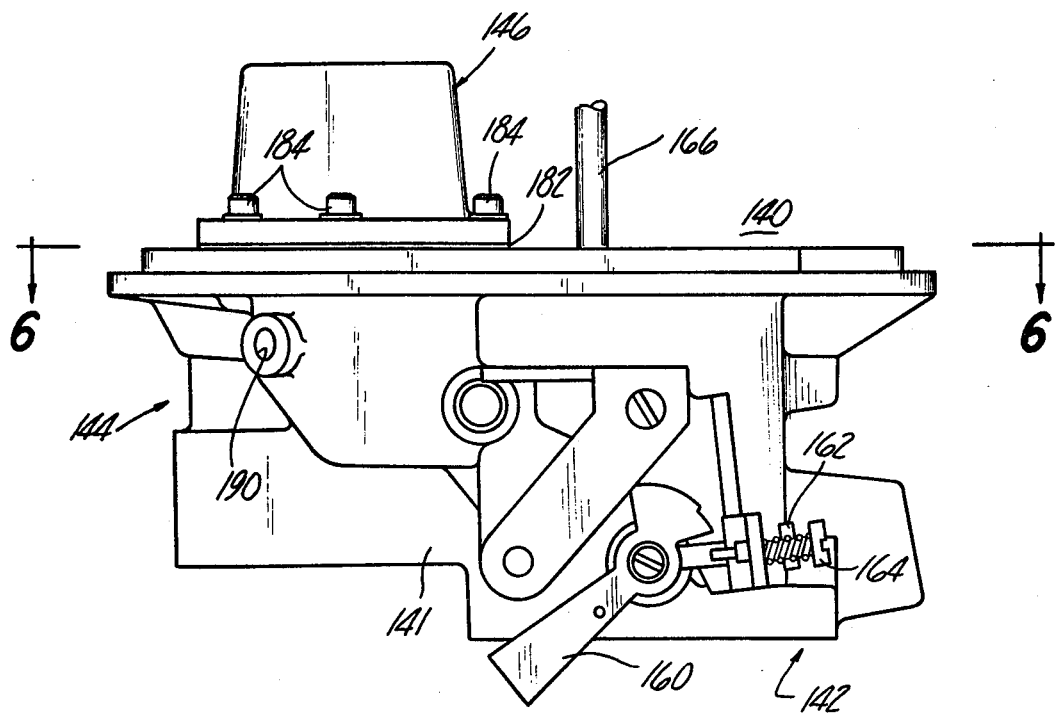
FIG. 5 is a side view of a throttle body and fuel bowl cover combination in which are incorporated the features of the present invention.

Referring now to the drawings and particularly FIG. 1 thereof, there is illustrated an internal combustion engine 30, an electronic control unit 32 for the engine and a fuel supply system 34, the control of the fuel supplied the engine being accomplished by the electronic control unit 32. Specifically, the engine includes the normal components such as an intake manifold 36, cylinder heads 38, 40 and valve covers 42, 44 as is typical in an eight cylinder V-type engine. For purposes of simplicity, the disclosure will be couched in terms of a V-8 type engine, but it is to be understood that the invention is equally applicable to engines having differing numbers of cylinders, as for example, four or six or twelve cylinders. However, it is felt that four cylinders per manifold plane is probably the maximum number of cylinders that can be accommodated for a single injector due to the number of pulses which must be generated by the electronic control unit per engine revolution. Also, in a V-6 engine, it has been found that the firing of the cylinders of the V-6 engine are not regularly spaced in that the engine fires at 90°, 240°, 330° and 480°, 570° and 720°. Accordingly, a different scheme of sensing crankshaft position would be provided for a V-6 engine.

The fuel system for the engine 30 is provided from a tank 48, the fuel from the tank 48 being fed to a throttle body 50 from a conduit 52 and a fuel pump 54. The return to the tank is provided by means of a conduit 58, the return fuel being delivered through either of two different types of pressure regulators as will be more fully explained in conjunction with the description of FIGS. 3, 4, 8 and 9.

The air being fed to the engine for mixture with the fuel is controlled by the operator through a throttle plate 60 positioned in the throat of the throttle body 50. The air is suitably filtered by means of an air filter assembly 62 as is conventional in internal combustion engines.

A modified electronic control unit 64 is included in the system of the present invention and the preferred form is of the speed density type which requires an engine speed sensor providing an input RPM signal (designated RPM) to the control unit 64 fed to the control unit 64 by means of a conductor 66. Also, the manifold absolute pressure of the engine is also sensed to provide a MAP signal on an input conductor 68. As is well known in the injection art, the combination of engine speed and MAP signal, particularly a function of the product thereof, will provide an indication of the mass air flow to the engine. It is this mass air flow which determines the mass of the fuel which is to be fed to the engine. This type of system is utilized in conjunction with an open loop control system. However, in a closed loop system, the control unit 64 is supplied with a signal from an oxygen sensor positioned, typically, in the exhaust system for the engine. The oxygen sensor then provides an indication to the control unit 64 whether the engine is operating at stoichiometric or either in the lean or rich side of stoichiometric. These concepts are familiar to those skilled in the fuel management art.

Referring now to FIG. 2, there is illustrated in diagrammetic form a two plane eight cylinder engine manifold 36 having an upper manifold chamber 70 illustrated in solid lines and a lower manifold chamber 72 illustrated in dotted lines. As was stated above, it is felt that the maximum number of cylinders per manifold plane which could be accommodated by the system of the present invention is four. However, most passenger car engines built in the United States have a dual manifold system for eight, V-6 and twelve cylinder engines and therefore the system of the present invention is applicable to most engines provided in passenger cars.

Referring particularly to the upper plane manifold chamber 70, it is seen that the chamber 70 feeds fuel charges to cylinders 2, 3, 5 and 8 with the configuration shown. The fuel charge is supplied by a single point injector scheme to be described hereinafter, the charge being introduced to the manifold within the throat 78 of the throttle body 50 described in conjunction with FIG. 1; and the fuel charge for the lower plane manifold 72 is supplied through a throat 80 of the throttle body 50.

As was stated above, it has been found that the system of the present invention provides an extremely even flow of fuel charged distribution from cylinder to cylinder when the effective manifold volume between the point of introduction of the fuel charge to the manifold and the intake valve is less than the volume of the particular cylinder being fed with fuel charge. Referring to manifold chamber 70, it will be seen that the effective volume of manifold 70 relative to cylinder 2 between throat 78 and the intake valve for cylinder 2, designated with reference numeral 84, is equal to the effective volume of the manifold chamber 70 between the throat 78 and the intake valve for cylinder 3, designated with reference numeral 86. The same condition exists for cylinders 5 and 8 relative to the remaining cylinders in the plane including manifold chamber 70. It will be seen that the manifold chamber 72 is another plane and is identically configured to manifold chamber 70 with the identical relationship of the chamber volume between throttle body throat 80 and the particular cylinder valve which is in the opening mode of operation, relative to the volume of the cylinder involved.

Referring now to FIG. 3, there is illustrated a schematic fluid diagram for a fuel feed system for the single point injector system, and particularly illustrating a bypass metering form of fuel pressure regulator. The fuel system includes the tank 48 and fuel 90 described in conjunction with FIG. 1. For the particular bypass metering pressure regulator system disclosed, a fuel pump 92 is submerged in the fuel 90 contained within the tank 48. The pump supplies fuel from a fuel line 94 to a fuel bowl 96 shown in dotted lines and it should be noted that an injector 100 is submerged within the fuel in the bowl 96. This fuel bowl 96 will be more particularly described in conjunction with FIGS. 6, 7, 8 and 9. The fuel feed to the injector is schematically illustrated in FIG. 3 as conduits 102, 104.

In actuality, the conduits 102 and 104 do not exist, rather the open injector 100 is simply submerged in the fuel contained within the fuel bowl 96. Fuel is also fed to a regulator 108, the details of which will be described in conjunction with the description of FIG. 9.

In the schematic diagram of FIG. 3, main fuel flow is schematically illustrated as being fed to the regulator 108 by a conduit 110, the conduit 110 being illustrated purely for descriptive purposes. Fuel also flows to the regulator 108 in the form of vapor from the injector or vapor formed within the fuel bowl 96 and this vaporized flow to the regulator is schematically illustrated as fuel flowing along line 110. The regulator 108 controls the pressure within the fuel bowl 96 in response to the fuel pressure within the fuel bowl 96. If the pressure becomes excessive, the regulator 108 opens to permit fuel to flow back to the tank 48 through a conduit 116. As pressure drops, the regulator valve moves toward the closed position to create a greater pressure drop across the regulator and thereby build up the pressure within the fuel bowl 96. As pressure drops further, the regulator will close to shut off the fuel flow in conduit 116. With the bypass system illustrated schematically in FIG. 3, the pump 92 can be a relatively low pressure pump to provide approximately 7 psi of fuel pressure within fuel bowl 96.

Referring now to FIG. 4, there is illustrated a modified form of pressure regulator system of the inlet metering type which again is utilized to feed fuel 90 contained within the tank 48 to the fuel bowl 96. The system illustrated in FIG. 4 includes a conduit 118 for feeding fuel from the tank to a fuel pump 120, the pump 120 providing pressurized fuel for introduction to the fuel bowl 96 through a conduit 122. As will be seen from a description of FIG. 8, the conduit 122 terminates at an inlet valve in the fuel bowl 96 in an inlet valve configuration which controls the flow of fuel at the inlet into the fuel bowl 96. As pressure within the fuel bowl 96 drops, the regulator 124 opens the inlet valve of the regulator 124 to permit additional fuel to flow into the fuel bowl 96. As pressure builds up within the fuel bowl 96, the regulator inlet valve moves toward the valve seat to create a larger drop across the inlet valve of the regulator. When the pressure reaches a preselected amount, the regulator valve closes to shut off fuel flow to the fuel bowl 96.

As was the case with the system of FIG. 3, an open type injector 128 is provided wherein the fuel bowl forms the housing for the injector and fuel is permitted to flow around the injector prior to exiting through the injector valve. Accordingly, any fuel which is vaporized in the area of the injector is free to float to the top of the fuel bowl 96 and to the fuel return line, schematically illustrated as line 132. A slight amount of fuel is permitted to flow out of the regulator and back to the tank by means of a conduit 132 to permit the vapor and a slight amount of fuel from the fuel bowl 96 to flow back to the tank to permit proper purging of vapor from the fuel bowl 96. The details and operation of the regulator of FIG. 4 will be more fully appreciated upon consideration of the discussion of the operation of the regulator illustrated in FIG. 8.

Figure 6:
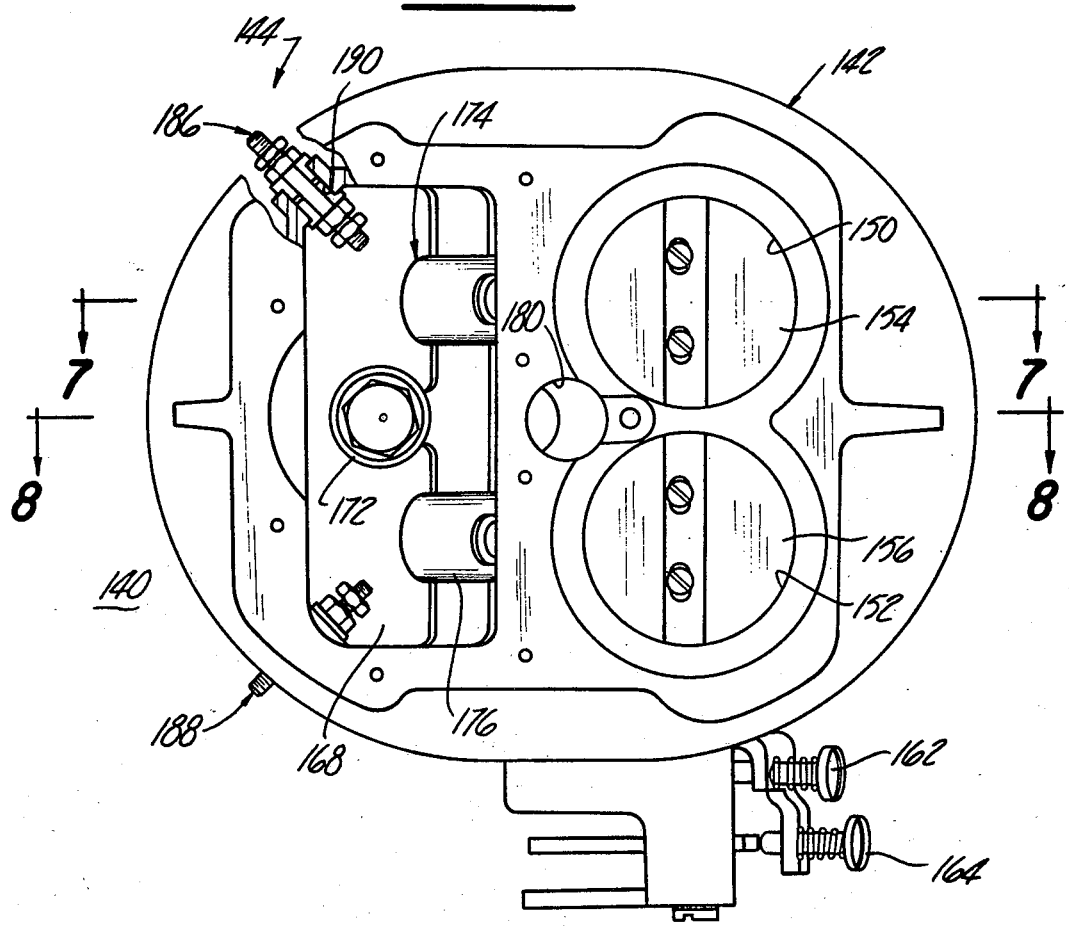
FIG. 6 is a cross sectional view of FIG. 5 taken along lines 6—6 thereof.

Referring now to FIGS. 5 and 6, there is illustrated the various details of a throttle body assembly 140 incorporating the features of the present invention. Particularly, the throttle body includes a throttle body throat section 142, and a fuel supply section 144. It will be noted that FIG. 6 is taken along 6—6 of FIG. 5 which thereby eliminates a cover assembly 146 from the details of FIG. 6. However, this opens an interior portion of the fuel supply section 144.

Referring specifically to the throttle body throat section, it is seen that a pair of throats 150, 152 are formed in the throttle body corresponding to the throats 78, 80 described above in conjunction with the description of FIG. 2. The interior of the throats 150, 152 are provided with a pair of throttle plates 154, 156 as is conventional. The opening and closing of the throttle plates 154, 156 are controlled by a throttle linkage 160 which include a pair of limiting adjustable screws 162, 164. Thus, the opening of the throttle plates 154, 156 are controlled simultaneously by the movement of linkage 160 and the closing limit of throttle plates 154, 156 are limited by the position of threaded screws 162, 164.

The air to the throats 150, 152 is suitably filtered by a filter element as described above in conjunction with the description of FIG. 1, the filter assembly being attached to an upstanding rod 166. The throats 152 correspond to the throats for an eight cylinder or six cylinder engine with dual plane manifolds described above. Further, as is noted above in the case of a four cylinder engine, the throttle body would include exactly one half of the items described in conjunction with the throttle throat section and to be described in conjunction with fuel supply section 144.

Figures 7, 8:
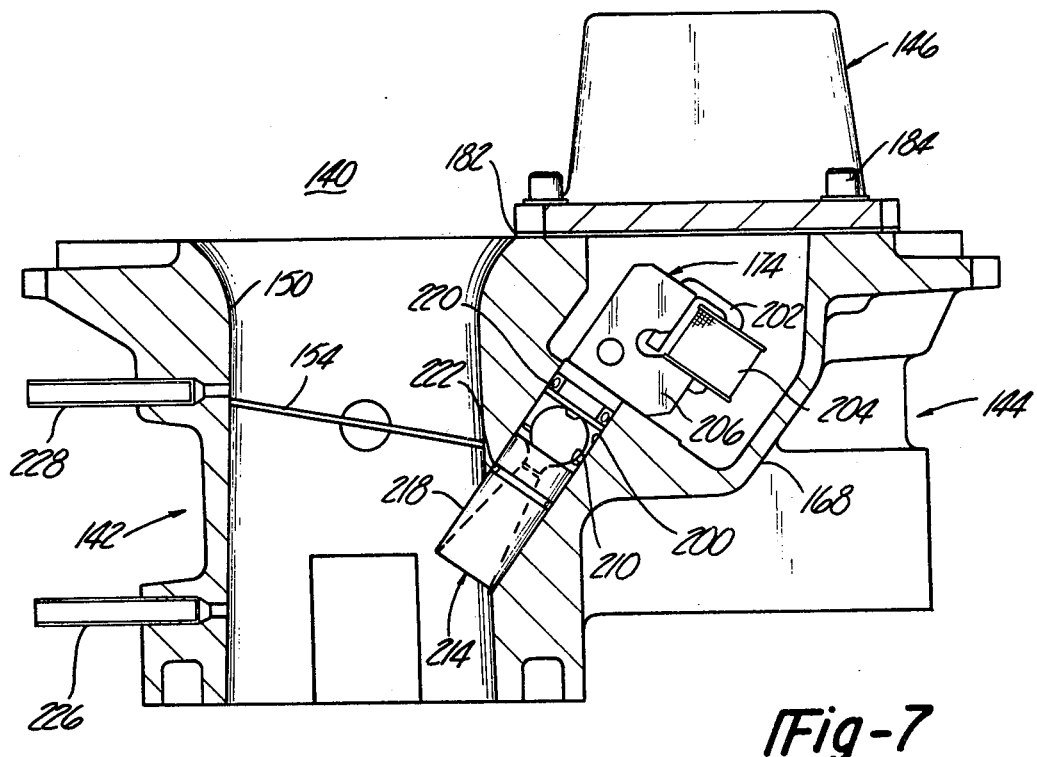
FIG. 7 is a cross sectional view of FIG. 6 taken along line 7—7 thereof with the fuel bowl cover added thereto, the figure particularly illustrating the relationship of the fuel injector and sonic nozzle associated with the system of the present invention.
FIG. 8 is a cross sectional view of FIG. 6 taken along line 8—8 thereof with the details of the intake metering pressure regulator added thereto.

Referring now to FIG. 6, there is illustrated the details of the fuel injector system and a portion of the details of the regulator system, the remaining details to be better understood from a description of FIGS. 7 and 8. Specifically, the fuel supply section 144 includes the cover 146 enclosing the upper portion of a fuel bowl 168 acting as a fuel accumulator, a sediment collector and a housing for the fuel injectors and the pressure regulator. Thus, the fuel bowl 168 forms a common housing for the major elements of the pulsed fuel injection system.

Specifically, fuel is introduced by means of an inlet valve 172, the fuel collecting in the bottom portion of the fuel bowl 168. The fuel which is accumulated in the fuel bowl 168 is fed to the throttle body throats 150, 152 by means of a pair of injectors schematically illustrated at 174, 176. The injectors are energized alternately at specific angles of engine rotation depending on the type of engine being supplied. As stated above, the injector 174 is energized every 180° of engine rotation, for example, 15° before top dead center for two cylinders of a single plane, and the other injector 176 is pulsed at 15° before top dead center for the other two cylinders in the other single plane at angles which are 90° apart from the injection pulses of injector 174.

The injectors, as will be seen from a description of FIG. 7, are of the sonic nozzle type and require a source of filtered air at the space between the outlet for the injectors 174, 176 and the inlet to the sonic nozzles to be described. Accordingly, the source of filtered air is fed to the injector by means of a cross feed manifold formed in the throttle body adjacent the outlet to the injectors (not shown) from a hole 180 drilled vertically in the throttle body. The hole 180 communicates with the interior of the filter 62 described in conjunction with FIG. 1.

As will be seen from a description of FIG. 8, a gasket 182 forms the diaphragm for the pressure regulator and a leak proof seal between the throttle body fuel bowl 168 and the housing cover 146. The cover 146 is fastened to the throttle body by means of a plurality of fasteners 184, the housing 146 being cut away around the area of aperture 180 to preclude interference with the free flow of air into aperture 180. The electrical connections to the injectors 174, 176 are provided by means of a pair of suitable electrically insulated and hydraulically sealed through connectors 186, 188. The connector 186 is formed by means of a threaded rod fed through an aperture 190, the rod being positioned within the aperture 190 by means of a pair of electrical insulators which also act as hydraulic seals. The seals are compressed between a pair of inboard lock nuts, the outer nuts being the fasteners for connecting the electrical conductors.

Referring now to FIG. 7, there is illustrated the specific details of the injector 174 mentioned above. As is seen from FIG. 7, the injector is positioned within the fuel bowl 168, and submerged within the fuel accumulated therein, the output nozzle of the injector being positioned within an aperture 200 formed in the throttle body between the fuel bowl 168 and the throttle body throat 150. While the details of the injector will be left for a description of FIGS. 11-14, the injector generally includes a C-shaped ferrons core 202 which is energized by a coil 204 wound around one leg thereof. The flux within the core 202 causes a generally flat armature (not shown) to move within a frame 206 and thereby open and close the communication of fuel between the interior of the fuel bowl 168 and a cross-feed, air-supply manifold 210. The cross-feed manifold 210 is in fluid communication with the aperture 180 vertically drilled into the throttle body. The pulse of fuel introduced into manifold 210 will then enter the intake throat of a sonic venturi 214, the venturi nozzle communicating manifold 210 with the throat 150.

The specific details of the development of the surfaces of the sonic nozzle will be described in conjunction with the description of FIG. 10. However, the outlet end 218 of the sonic nozzle is positioned near the intake manifold of the engine and therefore is subject to manifold absolute pressure. This reduced pressure will cause air to be drawn through the aperture 180, described in conjunction with FIG. 6, into the manifold 210 and through the sonic nozzle 214 to exit at the exit end of the sonic nozzle. The nozzle is such that a shock wave is created in the divergent portion of the throat due to the fact that the air is in excess of sonic speeds. Therefore, the fuel being injected into the sonic nozzle will hit the shock wave and fine atomization will take place due to the high air speed. It has been found that extremely find atomization occurs down to one inch of manifold vacuum and, with sonic nozzles being utilized in testing the system of the present invention, it has been found that sonic speeds are maintained down to four inches of vacuum.

In installing the sonic nozzle in injector, the nozzle and injector are both inserted into the aperture 200 from the fuel bowl side, the nozzle 214 being inserted first and the injector 174 being inserted thereafter. The fit between the sonic nozzle 214 and the aperture 200, is a press fit. A suitable O-ring 220 is utilized on the injector to preclude fuel leakage around those elements.

As was stated and as will be noted from the description of the electronics associated with the system of the present invention, the electronic control unit is of the speed density type and requires an indication of the manifold absolute pressure signal. Accordingly, a conduit 226 is associated with each throttle bore which communicates the portion of the throat 150 nearest the manifold with the exterior of the throat for connection to the manifold absolute pressure sensor. Conduits 226 are interconnected to provide an average MAP signal to the electronic control unit. Conduit 228 is used to provide a ported vacuum signal as is commonly required for spark timing and EGR control.

FIG. 8 discloses the specific details of a preferred form of pressure regulator 230 of the inlet metering type. The regulator generally includes a valve assembly 232 which is adapted to control the entry of fuel into the fuel bowl 168, a diaphragm assembly 234 which is utilized to control the opening and closing of the valve assembly 232, and a biasing spring assembly 236 which is utilized to bias the diaphragm assembly 234 in the downward direction tending to open the valve assembly 232.

The pressure regulator assembly 230 is adapted to control the pressure of fuel within the fuel bowl cavity 238 from a source of fuel supply at the tank described above in conjunction with FIG. 1. The tank is connected to an inlet connector 242 which, in turn, is connected to the throttle body by means of mating threads 244 formed on the exterior of connector 242 and the interior of a cavity 246 formed in the throttle body. The fuel is filtered through a filter assembly 248 inserted in the cavity 246, the filter being urged inwardly by the tightening of connector 242 and outwardly by means of a bias spring 250. Accordingly, fuel flows into the central cavity of the filter and radially outwardly through the filter medium into the cavity 246, up through a passageway 252, to the metering valve 232.

The metering valve 232 consists of a valve seat 256 which has an aperture 258 formed therein through which the fuel flows. The upper portion of the passageway 258 has a constricted metering orifice and a valve seat portion, the valve seat being adapted to mate with a ball and stem member 260. The ball and stem member 260 has an upper stem 262 which is adapted to engage the diaphragm assembly 234, and a lower stem 264 which is utilized to guide the ball and stem member 260 within the aperture 258. The ball and stem member 260 is resiliently urged upwardly by means of a spring element 268, the bias of the spring element being overcome by the diaphragm assembly 234 and spring assembly 236 in the absence of sufficient fuel in the fuel bowl cavity 233. As will be seen from a further description of the fuel injector, the injector is generally of an open configuration up into the chamber 238. If the fuel supply is depleted in chamber 238, the diaphragm assembly will move downwardly to open valve ball and stem member 260 thereby permitting fluid to run into the chamber 238.

The diaphragm assembly 234 includes the diaphragm 182 which acts as a gasket member between throttle body 141 and the cover member 146, and also acts as a flexible closure member for the fuel cavity 238. The central portion of the diaphragm 182 includes an aperture formed therein which is adpated to accommodate a rivet-like actuator plate member 274. The diaphragm assembly 234 further includes a washer member 276 positioned on the fluid cavity side of the diaphragm 182 and a generally cup-shaped washer 278 which is positioned on the opposite side of the diaphragm from the fluid cavity. The cup-shaped washer 278 is utilized to position the lower portion of a spring 280 forming part of the spring assembly 236. The upper part of the spring 280 is positioned within the housing 146 by means of an inverted hat-like retainer 284. The vertical position of the retainer 284 is adjustable by means of a threaded stud 290, the upper end of which is accessible from the exterior of the cap 146 which, when rotated, will vertically move the position of the retainer 284. A suitable vent hole 292 is formed in the housing member 146 to permit venting of the interior of closure member 146 to ambient air inlet pressure which also exists at the outlet of the injectors.

In operation, fuel enters the filter assembly 248 from the connector and flows into the passageway 252. If fuel in the fuel cavity 232 is depleted, the diaphragm assembly 234 will move downwardly to urge ball and pin member 260 downwardly. This movement will open the valve assembly 232 to permit fuel to flow into the cavity 238. As the pressure within cavity 238 builds up to the desired regulated pressure, the valve assembly 232 is closed. There is provided a bypass vent tube 294 which communicates the interior of the fuel chamber 238 with the tank through a hose connector (not shown). Accordingly, a small amount of fuel is continuously vented to the tank to remove any vapor from the fuel bowl cavity 238. It will be recalled that the injector is of the non-enclosed type whereby any vapor bubbles formed adjacent the valve will be permitted to flow to the top of the fuel bowl chamber 238. These vapor bubbles and any other vapor formed within the chamber 238 will be vented from the fuel bowl chamber 238 by means of the bypass vent 294. It has been found that the hot fuel handling of the engine can be improved by varying the diameter of the bypass vent whereby the time for starting the car after a hot soak would decrease as the diameter of the bypass vent was increased. The vent must be significantly smaller than the inlet to permit pressure buildup in the bowl.

As generally stated above, the pressure regulator illustrated in FIG. 8 is particularly adaptable for use with an intermittent flow pump having intake and discharge portions of a pump cycle. One such pump is typically used in internal combustion engines in automobiles and comprises a cam operated diaphragm pump which, on the discharge portion of the cycle, pressurizes the fuel system. On the intake portion of the cycle, flow to the system is not provided by the pump. Accordingly, the diaphragm 182 and fuel chamber 238 act as an accumulator whereby fuel being fed to the injectors and to the bypass conduit 294 is pressurized by the action of the diaphragm 182 and the spring 280. In this way, the intermittent operation of the pump is smoothed to provide a substantially constant pressure to the injectors. A check valve is provided in the fuel supply line to prevent reverse fuel flow.

Figure 9:
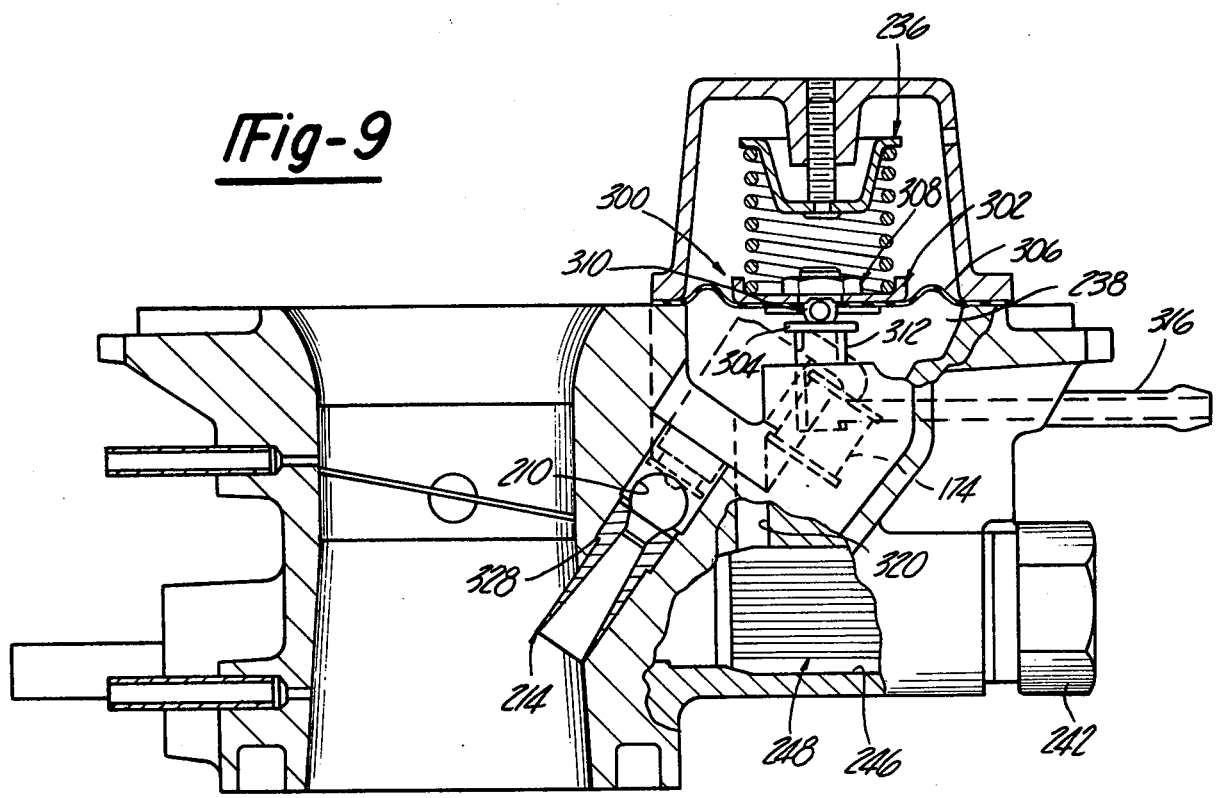
FIG. 9 is a cross sectional view of a throttle body incorporating the injector and sonic nozzle assembly of FIG. 7 and a modified pressure regulator of FIG. 8, the pressure regulator being the bypass metering type.

Referring now to FIG. 9, there is illustrated a modified form of the pressure regulator described in conjunction with FIG. 8. Particularly, a bypass metering type pressure regulator 300 is illustrated, the pressure regulator 300 including the identical spring bias assembly 236 being utilized as was described in conjunction with FIG. 8. However, a diaphragm assembly 302 utilized in this pressure regulator, is different in that a wobble plate 304 is attached to a diaphragm 306 by means of a ball and fastener assembly 308. The ball and fastener assembly includes a ball element 310 which is suitably carried within a housing to permit the ball to move to a limited degree relative to the diaphragm 306. In this way, the plate 304 is capable of being mated with an upstanding tube 312 which forms the outlet for the bypass metering pressure regulator. The upstanding tube is connected in fluid communication with an outlet conduit 316 to permit fluid to flow from the fuel bowl chamber 238, through the upstanding conduit 312 and back to the tank through the conduit 316.

In operation, fuel is introduced to the chamber 252 through the filter assembly 248 from the fuel tank and into the fuel bowl chamber 238 through a conduit 320 in fluid communication with the fuel bowl chamber 238. As pressure builds up within the fuel chamber 238, the diaphragm assembly 302 is moved upwardly to move plate 304 away from the upstanding conduit 312 and thereby open the valve. The position of the plate 304 relative to the upstanding conduit 312 determines the pressure drop across the pressure regulator and thus the pressure within the fuel chamber 238. The general configuration of the pressure regulator is described in U.S. Pat. No. 3,511,270, issued May 12, 1970, However, that patent does not disclose the concepts, inter alia of incorporating the pressure regulator within the throttle body and utilizing the diaphragm as a seal between the throttle body and the cover for the fuel bowl.

With the pressure regulator of the type disclosed in FIG. 9, it is seen that any fuel vapor which forms around the outlet section of the injector 174 or within the fuel bowl chamber 238 will gather adjacent the upstanding outlet conduit 312 to be vented to the tank through the conduit 316. In this way, hot fuel handling is improved over previously known fuel handling systems.

Figure 10:
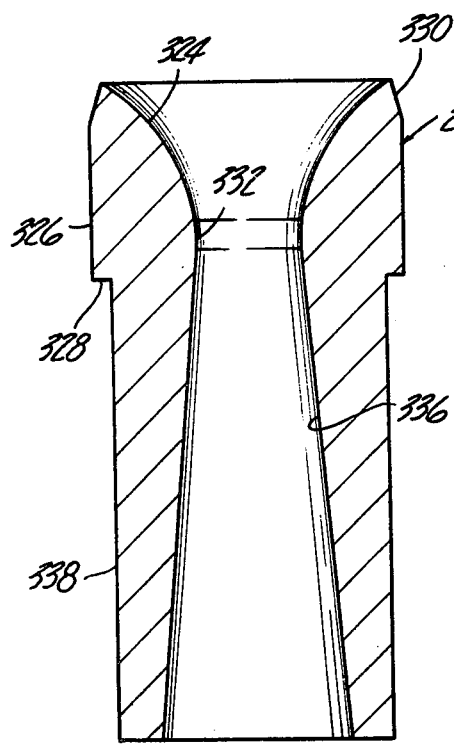
FIG. 10 is a cross sectional enlarged view of the sonic nozzle of FIGS. 6 and 9 illustrating the specific details of the nozzle.

Referring now to FIG. 10, there is illustrated the details of the sonic venturi 214 which fits the aperture formed in the throttle body 141 with a light, press-fit. Specifically, the sonic nozzle is formed with a converging throat surface 324 which is formed with a 0.35 inch radius. The exterior surface 326 is formed with a notch 328 which mates with the notch 328 illustrated in FIG. 9. In this way, the sonic nozzle is press-fitted from the fuel bowl cavity 238 without permitting the assembler to drive the sonic nozzle through the throttle body into the throat section. A slightly chamfered surface 330 is formed with a 15° convergent angle to a point above the sonic nozzle as illustrated in FIG. 10. A generally constant diameter surface 332 is formed, the axial length of the surface being approximately 0.06 inches. The sonic nozzle then is developed with a diverging section formed by a surface 336, the diverging section being formed with a 15° angle total or 7½° from the center line of the sonic nozzle. The distance between the upper end of the sonic nozzle 214 and the notch 328 is selected to be approximately 0.31 inches while the overall length of the nozzle is 1.06 inches. The constricted throat in the area of the constant diameter section defined by surface 332 has a diameter of 0.165 inches while the overall diameter of the nozzle at the exterior surface 338 of the divergent section is 0.438 inches.

The dimensions given above are for a preferred form of the sonic nozzle for use in connection with the system of the present invention. However, it is to be understood that the configuration of the nozzle may be varied to provide the sonic shock wave in the divergent portion of the nozzle formed by surface 336 during a large portion of the operating range of the engine.

Figure 11:
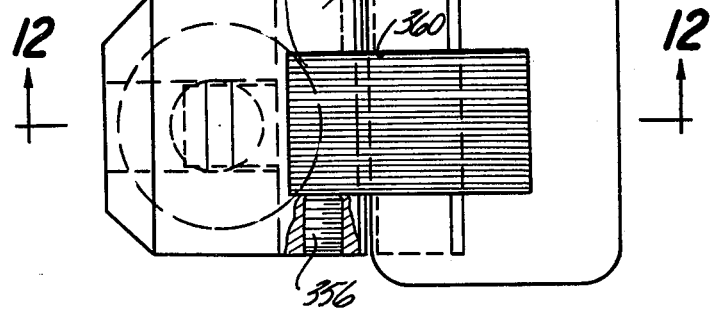
FIG. 11 is a plan view of a preferred form of fuel injector utilized in conjunction with the present invention.
Figure 12:
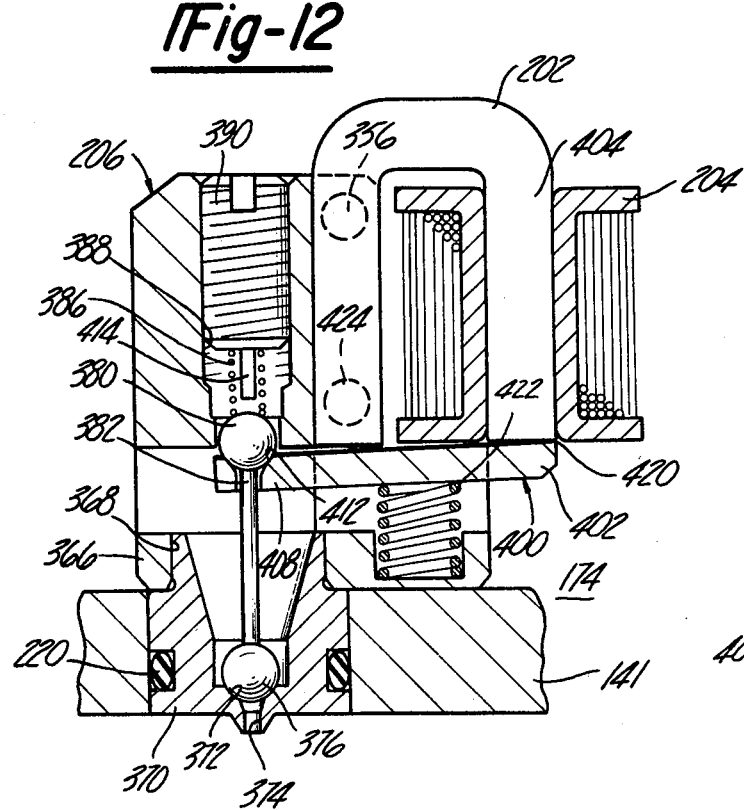
FIG. 12 is a cross sectional view of the injector of FIG. 11 taken along line 12—12 thereof.
Figure 13:
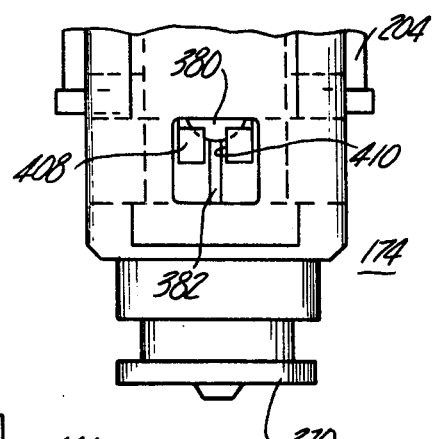
FIG. 13 is a side view of the injector of FIG. 11 and particularly illustrating the retainer for the ball valve assembly.

Referring now to FIGS. 11-13, there is illustrated the specific details of a preferred form of the submerged injector being utilized in conjunction with the system of the present invention. As can be seen from the drawings, the injector is extremely simple in construction and has been found to be reliable in operation. The injector uses the housing of the fuel bowl to contain and pressurize the fuel relative to the injector. In this way, any vaporization of the fuel in the area of the outlet valve of the injector is free to rise to the top of the fuel bowl and subsequently be vented from the fuel bowl to the fuel tank.

The injector consists basically of a frame member 206 to which is attached a C-type core element 202 of the conventional type. One leg of the core 202 is provided with a coil 204, the coil, in the preferred form, being wound of 150 turns of AWG 26 wire. The core 204 is attached to the frame member by means of a set screw 356 to permit adjustment of the position of core 202 relative to the frame 206.

Referring specifically to the frame member 206, it is seen that there is a cut out formed as a yoke to receive the C-type core 202. In this way, the set screw 356 will urge the C core toward the other side of the cut out portion to provide a clamp fit between a leg 362 and the set screw 356.

A lower portion 366 of the frame member 206 is formed with a circular aperture 368, the aperture being sized to receive a valve seat member 370 of approximately 0.35 inches diameter. The valve seat 370 is formed with an external groove to receive the O-ring 220 and also is provided with a valve seat 372 and a metering orifice 374. The valve seat is formed by a coining operation with a ball element, the diameter of the ball element being over-sized relative to the diameter of ball element 376 forming the operative part of the valve armature. The valve seat is coined in accordance with the principles taught in commonly assigned co-pending application Ser. No. 697,173, filed June 17, 1976, now U.S. Pat. No. 4,030,668, issued June 21, 1977, by Alex M. Kiwior, which disclosure is incorporated by reference. As noted above, the valve seat member 370 is inserted into the aperture formed in the throttle body 141, a seal being formed by the O-ring 220.

The armature portion of the valve assembly is provided with two balls 376, 380, the two balls being interconnected by a rigid stem 382. The armature assembly is forced downwardly by means of a biasing spring 386 contained within a cavity 388 formed in the upper end of the housing 206. The spring compression is adjusted by means of a set screw 390 threadedly positioned within the aperture 388. The movement of the set screw 390 in the up or down direction increases or decreases the compression of the spring 386 to vary the operation of the valve assembly during the low pulse width operation, as will be explained hereinafter.

The opening and closing of the valve assembly is controlled by means of a flat armature member 400 which closes the open end of the C-core 202 as is common in this type of electromagnetic assemblies. The right end 402 of the armature 400 is positioned against the open face of C-core 202, and particularly leg 404 thereof, and the left end 408 of the aramture 400 is adapted to engage the upper ball 380. best seen in FIG. 13, the left end 408 is provided with a slot 410 through which the stem element 382 is passed to position the upper ball 308 above the left end 408 of the armature. The armature 400 is provided with a coined seat 412, the seat being coined in accordance with a method similar to the coining of seat 372. The ball 380 is positioned within the seat 412 and resiliently retained thereby the spring element 386. A pin 414 is positioned at the lower end of set screw 390 to form a guide for spring 386.

To provide a preselected force for the opening of the valve formed by valve seat 372 and ball 376, a preselected air gap must be provided between armature 400 and C-core 202. In order to provide this preselected air gap, the upper edge of armature 400 is provided with a clad material which is nonmagnetic in nature yet provides a good surface for the coining operation associated with the end of armature 408 and the movement of the end 402 of the armature relative to the C-core 202.

The clad is designated with reference numeral 420 and its thickness is greatly exaggerated. It has been found that a clad depth of approximately 0.002 inches and fabricated of such materials as copper, aluminum, zinc, brass, nickel or plastic are suitable for the operation of this injector.

The armature 400 is held against the C-core to the extent permitted by spring element 386, by means of a spring 422 and a second set screw 424 has been provided, in cooperation with set screw 356 to permit upward and downward movement of the C-core 202 for static adjustment. In this way, the static or deenergized air gap of the electromagnetic assembly, particularly between the area adjacent end 408 and just below set screw 424, may be adjusted.

Accordingly, after assembly of the injector illustrated in FIG. 12, the injector is adjusted for both the static and dynamic operation in accordance with the particular flow required and the degree of travel desired upon energization of the coil. In order to adjust the static air gap, the set screws 356 and 424 are loosened and the core 202 is moved relative to the frame 206 until the desired air gap between the armature 400 and the leg of the core 202 below the set screw 424 reaches the desired amount. The set screws are then tightened and the coil energized. With the coil energized with short duration pulses, the set screw 390 is adjusted to adjust the compression of spring 386 to provide the desired flow from the orifice 374. The injector is then supplied with long duration pulses to determine if sufficient travel has been provided in the injector to achieve the desired flow.

Figure 14:
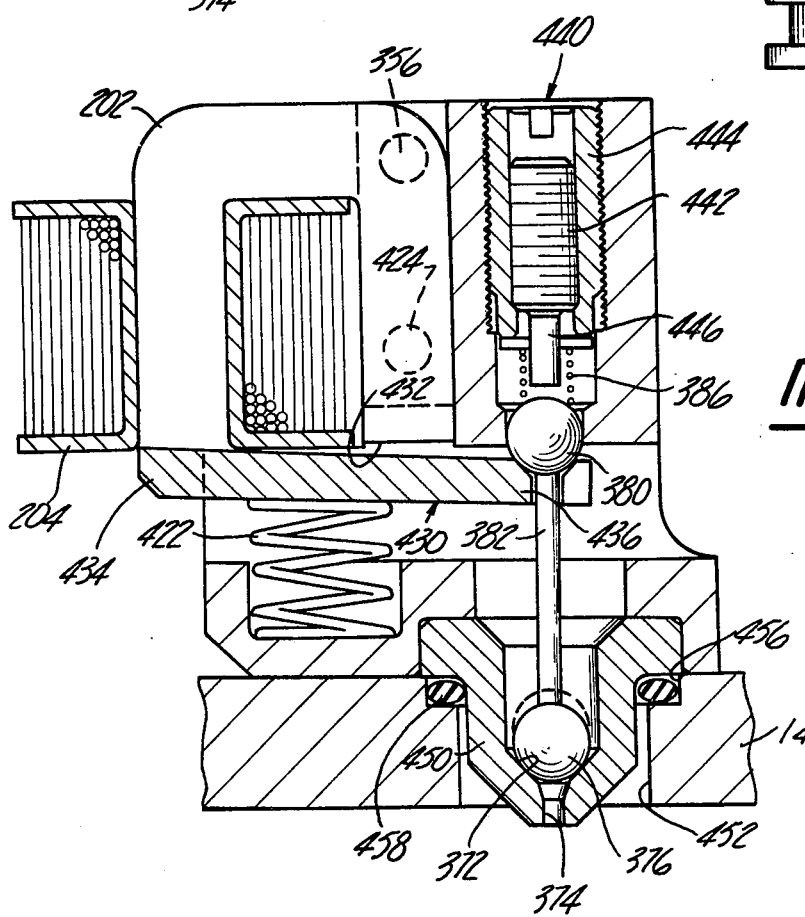
FIG. 14 is a cross sectional view of a modified form of the injector of FIG. 12.

Referring now to FIG. 14, there is disclosed a modified form of the injector illustrated in FIGS. 11-13. Basically, the injectors are similar with the exception of the adjustment mechanism associated with spring 386 and the stop for the upper travel of ball 380, the configuration of the armature 400 and the configuration of the lower end of the valve assembly as it is interfitted with the aperture formed within the throttle body.

An armature 430 is provided of the same general configuration as the armature 400 with the exception that the armature 430 is not clad as was discussed in conjunction with the armature 400. Rather, the adjustment for the air gap between aramture 430 and a surface 432 is provided by adjusting the core 202 in a vertical direction to achieve the desired air gap. As was the case with the injector of FIG. 12, an end 434 of armature 430 is resiliently urged toward the bottom of the C-core by means of a spring 422. The right end 436 of the armature is coined as was the case of armature 400 and a slot is formed therein to permit the movement of the stem 382 into the seat formed by the coining of end 436. However, as was stated, in lieu of the clad arrangement to provide the desired air gap, the C-core 202 is moved vertically after the set screw 356, 424 have been loosened. The position of C-core 202 is then maintained by tightening screws 356, 424.

The adjustment for the compression of spring 386 and the provision of the stop for the upward movement of ball 380 is achieved by adjustment assembly 440, the assembly including inner and outer set screw members 442, 444, the outer member 444 threadedly engaging an interior bore formed in the throttle body. As is readily apparent from the configuration shown, adjustment of the threaded member 444 will adjust the compression of spring 386 and subsequent adjustment of interior threaded set screw 442 will move a pin 446 in a vertical fashion to adjust the stop for the upward movement of ball 380.

The actual valve portion of the assembly is modified from that shown in FIG. 12 in that the valve seat element 450 is formed of a diameter slightly less than the diameter of aperture 452. Thus, there is a loose fit between the outer diameter of valve seat 450 and the inner diameter 452. The throttle body has been provided with a counter sunk groove 456 which is adapted to receive a resilient O-ring 458 therein to provide the seal between the valve member 450 and the throttle body element 141. It is to be noted that the valve element is identical to that described in conjunction to FIG. 12 in that the valve seat 372 is formed by an oversized ball in a coining operation, the ball being large relative to the lower ball 376 of the valve element. The valve element includes a second ball 380 which is contained within the coined end 436 of the armature 430, the balls 376 and 380 being interconnected by a stem member 382. Again, the coining operations described are those operations described in co-pending application Ser. No. 697,173. Also, the ball 380 in both cases must be sufficiently positioned into the aperture formed in its respective frame to preclude unwanted transverse movement.

With the exception of the physical differences, the valves of FIGS. 12 and 14 operate identically except for the adjustment required to maintain the air gap between armature 430 and the end 432 of C-core 202. Also, the adjustment for the spring 486 and stem 446 are slightly different. In other respects, the injector is an inexpensive, generally open injector to permit venting of vapor bubbles from the fuel bowl to preclude vapor lock.

As stated above, the system of the present invention utilizes a modified electronic control unit presently being sold by The Bendix Corporation. With the modified unit, it has been found that the best distribution of the air/fuel ratio from cylinder to cylinder is achieved if the injectors are pulsed at 15° before top dead center for the opening intake valve. FIG. 15 illustrates the diagram of the intake valve lift relative to degrees of engine rotation for one manifold plane of an eight cylinder engine. Specifically, the firing order of the cylinders for the illustrated engine are cylinders 1, 4, 6 and 7. At 90°, 270°, 450° only one valve is open per plane. Fuel injected to arrive at the particular cylinder near this time can only go to the cylinder with the open valve. The timing of the pulse must lead the 90° point by an amount which allows for the air in the manifold to be drawn into the particular cylinder with the valve open. With the system of the present invention, the fuel injection for cylinder 1 occurs at a point 15° before the illustrated 720° point and is shown as the start of a pulse occurring before the 720° point. The end point of the pulse is left indeterminate as the duration of the pulse, and as will be seen from a description of the electronic circuitry, is indeterminate without further inputs as to the engine speed, MAP and throttle position. Similar injection pulses will occur at 15° before the 180° point, 15° before the 360° point and 15° before the 540° point for the wave form illustrated. It is to be understood that the other injector for cylinders 2, 3, 5 and 8 will occur 15° before the 90°, 270°, 450° and 630° points.

FIGS. 16 and 17 illustrate the effect of injection timing on distribution of air/fuel ratios from cylinder to cylinder for two vehicle speeds depending on whether the volume of the intake manifold between the point of injection of the fuel and the intake valve to receive the fuel charge relative to the cylinder volume is less or greater than one, respectively. In FIG. 16, the situation is such that the per cylinder manifold volume between point of injection of the fuel and the intake valve is less than the cylinder volume. From the diagram, it is seen that the best air/fuel ratio spread between cylinders (one air/fuel ratio) occurs at injection timing of 15° before top dead center. With the diagram of FIG. 17, the per cylinder intake manifold volume between the throttle throat and the intake valve is greater than the individual cylinder volume not allowing the fuel to reach the intake valve before it closes. In this situation, the air/fuel ratio spread between cylinders is approximately 1.5 and occurs when the injection timing 45° before top dead center. However, it is seen that the curve is erratic and may vary for varying degrees of per cylinder intake volume to cylinder volume ratios.

Figure 18:
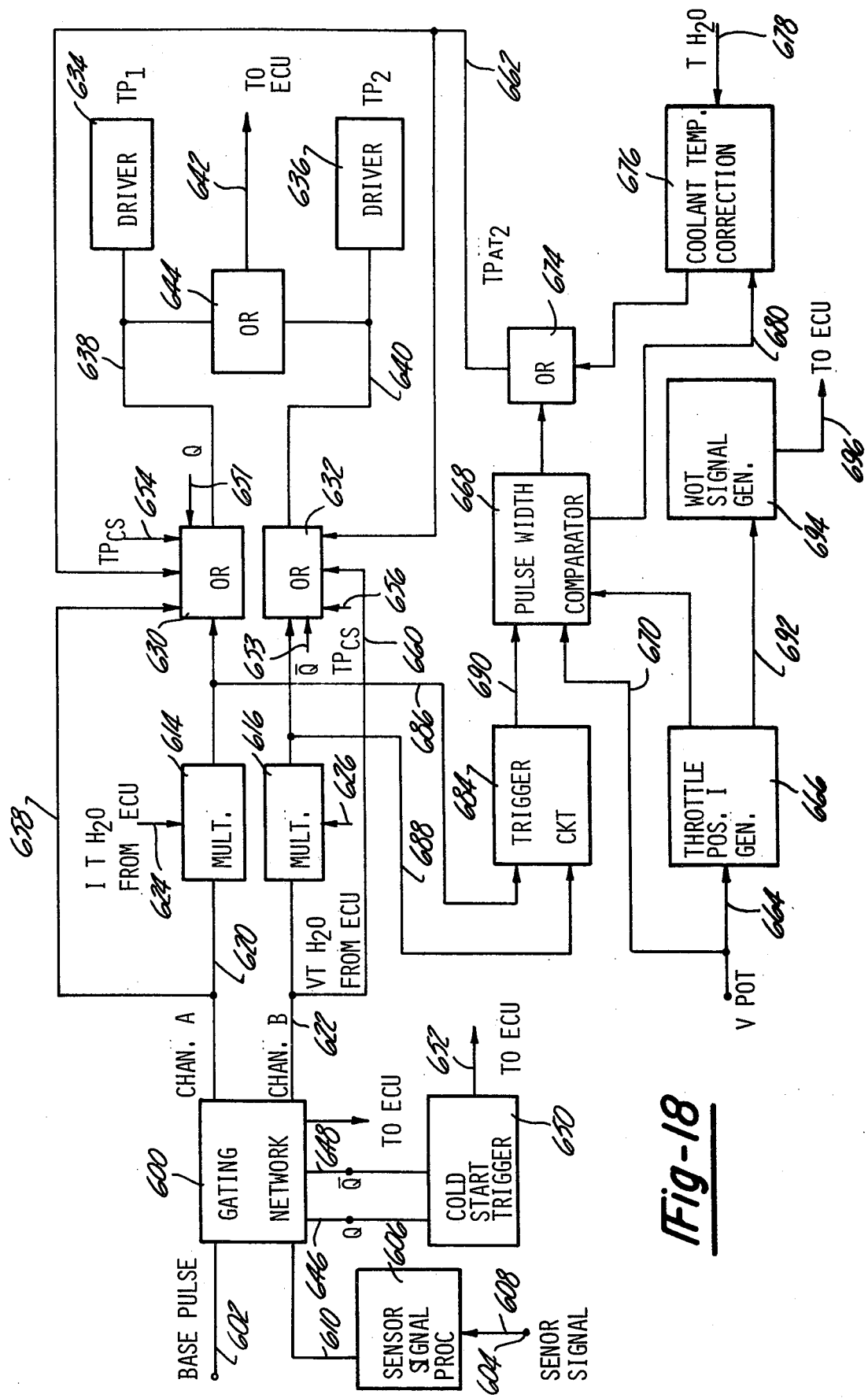
FIG. 18 is a block diagram illustrating the overall scheme for modifying a standard electronic control unit described above.

Referring now to FIG. 18, there is illustrated the schematic diagram of the basic modification circuit which is to be associated with the electronic control unit characterized above as a standard electronic control unit. As previously stated, the base pulse calibration of the standard electronic control unit is reduced by a predetermined multiple, in this case by a factor of one half, and the base pulse is fed from the electronic control unit to a gating network 600 by means of a conductor 602. The gating network 600 is utilized to control whether the first injector, characterized channel A, or the second injector, characterized channel B, is to be pulsed with the next injector pulse. The operation of the gating network 600 is controlled by means of a sensor signal fed to an input terminal 604 and then to a sensor signal processor circuit 606 by means of a conductor 608. The output of the sensor signal processor circuit is fed to the gating network 600 by means of a conductor 610. Accordingly, the sensor signal operates on the gating network to enable channel A or channel B, the enabled channel being the channel which receives the base pulse from conductor 602.

The output of the gating network is fed to a channel A multiplier circuit 614 or a channel B multiplier circuit 616 by means of conductors 620, 622, respectively. The multipliers are utilized to generate an additional pulse to be added to the end of the base pulse being fed to the particular multiplier. The multiplier network 614 or 616 then provides the additional pulse noted having a duration which is a function of the factor by which the base pulse calibration was initially adjusted. The multiplier circuit 614 also receives a signal from the electronic control unit which is indicative of the coolant temperature, the signal taking the form of a current signal, to control the multiplier pulse duration in response to coolant temperature. Similarly, the multiplier 616 receives a coolant temperature signal from the ECU by means of a conductor 626, this signal being a voltage signal indicative of the coolant temperature, to again operate on the multiplier circuit 616 as a function of coolant temperature.

The output of the multiplier circuits 614, 616 are fed to a pair of OR gates 630, 632, the OR gates adding the multiplier pulse to the base pulse and connecting the composite pulse to driver circuits 634, 636 by means of conductors 638, 640. The driver circuits are utilized to provide the necessary signal characteristics to energize the injectors and provide a pulse of fuel of preselected quantity to the throttle body throat. During the initializing of the electronic control unit, the conductors 638, 640 are grounded by the electronic control unit through a ground signal impressed on conductor 642. This ground signal on conductor 642 is generated when initial power is applied to the electronic control unit and the conductors 638, 640 are grounded to preclude a pulse being fed to the injectors during initializing.

The output pulse to the drive circuits 634, 636 are modified depending on the particular type of operation being encountered. For example, the gating network produces signals designated Q on conductor 646 and $\overline{Q}$ on conductor 648, which signals are cold start trigger signals fed to an OR gate 650 designated cold start trigger. The output of the cold start trigger is fed to the electronic control unit by means of a conductor 652. In this way, the cold start trigger signals are generated in the electronic control unit in response to the sensing by the electronic control unit that the engine is being started. These signals only appear during the starting phase of vehicle operation. The output of conductors 646, 648 are fed to the input of OR gates 630, 632 by means of conductors 651, 653, respectively. These signals are to control the feeding of cold start pulses to the output driver circuits 634, 636 from the standard control unit through conductors 654, 656. The cold start pulses, designated $TP_{cs}$, are of longer duration than the composite base and multiplier pulses being fed to the OR gate 630, 632 and therefore the only pulses seen at the driver circuits 634, 636 during cold start are the cold start pulses.

Referring back to the multiplier circuits 614, 616, it is seen that the channel A pulse on conductor 620 and the channel B pulse on conductor 622 are fed forward to OR circuits 630, 632 respectively by means of conductors 658, 660, respectively. Accordingly, when a pulse appears on conductor 620 or conductor 622, these pulses are fed to the respective OR circuits 630, 632 and then to the respective driver circuits 634, 636 to be utilized to energize the respective injector. Upon termination of the channel A or channel B pulse, the multiplier circuits 614, 616 take over and adds to the pulse which has just been terminated by a pulse generated by the multiplier. Thus, the channel A pulse is added to the multiplier pulse from multiplier circuit 614 to produce the total $TP_1$ pulse at the output of driver circuit 634. Similarly, the channel B pulse on conductor 622 is added to by the multiplier circuit 616 to provide a total $TP_2$ pulse at the output of driver 636.

The system also includes an acceleration enrichment pulse generating capability, the acceleration enrichment pulse being generated on a conductor 662, which pulse is fed to the input of OR gates 630, 632 to be added to the multiplier pulse in response to the throttle position signal on conductor 664. The input signal is fed to a throttle position current generator circuit 666, the output of which is fed to a pulse width comparator circuit 668. The comparator circuit 668 also receives the voltage corresponding to the throttle position by means of a conductor 670. The pulse width comparator 668 has the capability of sensing both throttle position and rate of change of throttle position and, by making a comparison between these signals, will generate an acceleration enrichment pulse depending on these two factors. This pulse is fed to an OR gate 674, the output of which provides the signal level on conductor 662.

This acceleration enrichment pulse is corrected for engine coolant temperature by means of a coolant temperature correction circuit 676, the input of which receives a signal indicative of the engine coolant temperature on an input conductor 678. The length of the coolant temperature correction pulse from circuit 676 is dependent on two factors. One being the width of the AE pulse as fed thereto from the pulse width comparator circuit 668 on a conductor 680. The other condition, of course, is the engine coolant temperature.

The pulse width comparator circuit is reset periodically by a trigger signal from a trigger circuit 684, the trigger circuit being triggered by either the output of multiplier 614 on conductor 686 or the output of multiplier 616 as sensed by the signal level on conductor 688. The trigger circuit 684 resets the pulse width comparator by means of an output signal on conductor 690.

The system also has the capability of generating a wide-open throttle (WOT) signal which is utilized in the electronic control unit for various functions. This is accomplished by sensing the analog voltage level of the throttle position sensor output signal on a conductor 692, this signal being fed to a wide-open throttle signal generator 694. The signal generator 694 compares the signal level on conductor 692 with a preselected reference indicative of the wide-open throttle position. When the wide-open throttle position is sensed, the standard control unit is fed a signal on conductor 696. It should be noted that the acceleration enrichment pulses are phased with the normal injection pulse.

Referring now to FIG. 19, there is illustrated a modified form of the acceleration enrichment pulse generator circuit illustrated at the bottom of FIG. 18. The circuit of FIG. 19 is similar in some respects but adds the capability of providing a slow decay function for the acceleration enrichment pulse. This has been found to improve the driveability of the automobile during the operation of the vehicle which requires an acceleration enrichment pulse. The output of this circuit is added to the end of the base pulse instead of the multiplier pulse.

Specifically, the circuit 700 includes a throttle position current generator circuit 702 which receives an input signal from a linear throttle position potentiometer at conductor 704. The standard electronic control unit supplies a base pulse to a trigger circuit 706 by means of a conductor 708. The outputs of the throttle position current generator 702 and the trigger circuit 706 are fed to a pulse width comparator circuit 712 by means of a conductor 714, the output of the pulse width comparator circuit 712 being utilized to generate an acceleration enrichment pulse on output conductor 716. As was the base previously, the throttle position current generator supplies the operative signal to the pulse width comparator and the trigger circuit 706 periodically resets the pulse width comparator.

The circuit also includes a slow decay differentiator circuit 720 which receives an input from the linear throttle position potentiometer on input conductor 722. The slow decay differentiator circuit 720 provides an "after transient" decay function on output conductor 724 to be fed to the pulse width comparator. This function is proportional to the rate of change of throttle position and the output of the pulse width comparator circuit 712 will no longer be the sharp transient described in conjunction with FIG. 18 but rather will have an exponential decay characteristic.

As was the case with FIG. 18, the circuit provides a means for generating a wide-open throttle signal by means of a signal generator circuit 730 which receives an analog throttle position signal proportional to throttle position from the throttle potentiometer. The output of the wide-open throttle signal generator is fed to the standard electronic control unit by means of a conductor 734 to be used for the purposes normally inherent to the electronic control unit.

Figure 20:
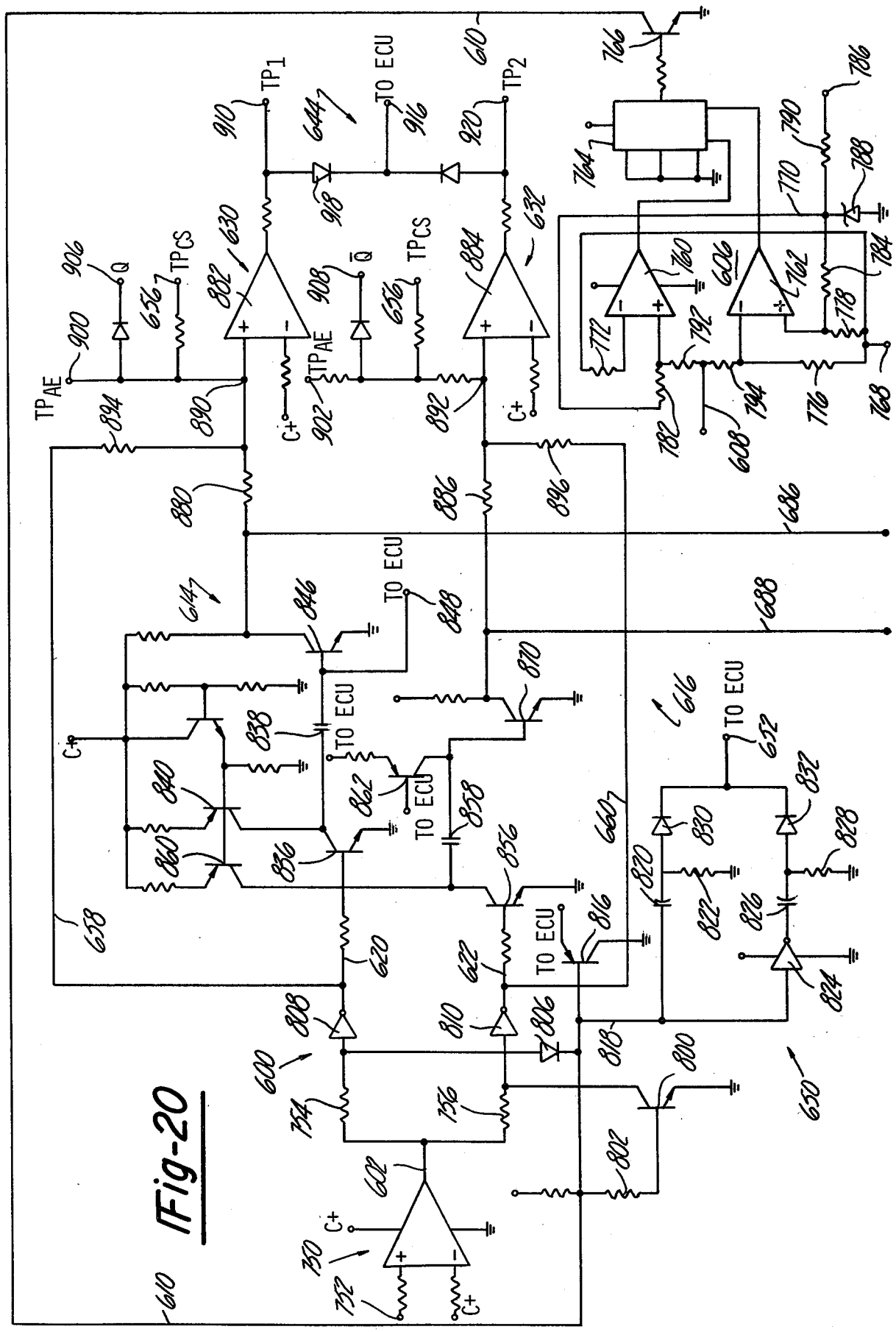
FIG. 20 is a schematic diagram illustrating a portion of the electronic details of the block diagram of FIG. 18.

Referring now to FIG. 20, there is illustrated the circuit schematic details of the upper half of the block diagram illustrated in FIG. 18. Specifically, the base pulse from the electronic control unit is fed through a buffer amplifier 750, the base pulse being fed to the buffer amplifier from the electronic control unit at input terminal 752. The input to the operational amplifier at conductor 602 is a modified base pulse wherein the normal calibration of the base pulse has been modified by some fraction and impressed on conductor 602. The modified base pulse is fed to a pair of resistors 754, 756 corresponding to channel A and channel B, respectively.

The determination of whether the base pulse is to be fed to channel A, one injector, or channel B, the other injector, is controlled by means of a crankshaft position sensor which generates the sensor signal which is fed to a sensor signal processing circuit 606. The circuit 606 provides the output signal on conductor 610 to determine which channel the base pulse is to be fed. Referring to the specific details of the circuit 606, an input trigger signal from an engine position sensor device is fed to the input conductor 608. In the particular system being illustrated, the crankshaft position sensor takes the form of a disc having two lobes formed thereon, each lobe being 90° in angular length and being spaced 90° apart. Accordingly, a positive spike is generated each time, for example, the engine passes through 90° or 270° of rotation and a negative spike is generated each time the engine passes through 180° and 360°.

This input trigger signal is fed to a pair of voltage comparators 760, 762, the voltage comparators 760, 762 being connected to control the set and reset conditions of an output flip flop 764. The output of the flip flop 764 takes the form of a 50% duty cycle square wave. The output of the flip flop 764 is made to control the gating network by providing an output circuit including an open collector transistor 766 which is connected to the output conductors 610.

This input trigger signal is fed to a pair of voltage comparators 760, 762, the voltage comparators 760, 762 being connected to control the set and reset conditions of an output flip flop 764. The output of the flip flop 764 takes the form of a 50% duty cycle square wave which is similar to the output of a Hall effect device. The output of the flip flop 764 is made substantially identical to the Hall effect device by providing an output circuit including an open collector transistor 766 which is connected to the output conductors 610.

Bias for the voltage comparator 760, 762 is provided during the period when the ignition is on by means of a signal fed to an input conductor 768, the negative bias being fed to the inverted input of operational amplifier 760 by means of a conductor 770 and a resistor 772. Negative bias is provided to amplifier 762 when the ignition is on by means of conductor 768 and a resistor 776. The operational amplifier 762 is also provided positive bias from the conductor 768 by means of a resistor 778. During cranking, the operational amplifier 760, 762 are increased in sensitivity by providing a 4.7 volt potential at the positive inputs thereof by means of resistors 782, 784. This positive bias is provided from a crank signal fed to an input conductor 786 which provides current to break down a zener diode 788 through a resistor 790.

Accordingly, when the engine is cranking, the positive and negative signals from the crankshaft position sensor associated with the engine are fed from conductor 608 to operational amplifiers 760 by means of a resistor 792 and to the negative input of operational amplifier 762 by means of a resistor 794. The added positive current to operational amplifier 760 from the positive going spike will provide an output signal in the form of a pulse from operational amplifier 760 to set flip flop 764. On the other hand, when the negative spike is sensed on conductor 608, the operational amplifier 762 resets flip flop 764. This provides a logical 1 and logical 0 signal at the output of flip flop 764.

This signal on conductor 610 controls the conductive condition of a transistor 800 through a base driver resistor 802. Accordingly, when the voltage on conductor 610 is high, the transistor 800 will be conducted to shunt the current through resistor 756 to ground to cause the pulse on conductor 602 to be fed through resistor 754. On the other hand, when transistor 800 is cut off due to a low signal on conductor 610, the signal is fed through resistor 756 and the signal on resistor 754 is shunted through a diode 806.

Therefore, a base pulse which is directed through channel A is fed through an inverter 808 and a base pulse which is to be utilized in channel B is directed through an inverter 810. It is to be noted that the trigger signal after it is processed by the signal sensor processor 606 is fed to the standard control unit by means of a transistor 816, the transistor 816 signalling the standard control unit to initiate a base pulse.

The system also includes a cold start trigger circuit 650 which is provided the 50% duty cycle engine position sensor signal on conductor 610 by means of a conductor 818. The pulse start circuit includes a capacitor 820, resistor 822 combination, and an inverter 824, capacitor 826 and resistor 828 combination. The signals on the outputs of these networks are fed through a pair of diodes 830, 832, respectively, to provide positive spikes at output terminal 652 each time the signal on conductor 610 changes state. Accordingly, output trigger pulses will be generated at terminal 652 and fed to the standard control unit, four time per engine revolution for an eight cylinder engine. These pulses to the standard control unit are utilized to generate the cold start signal pulses which overlap the normal base pulse and, in fact, are of sufficient duration to mask the entire base pulse. This will be explained more fully hereinafter.

Assuming for example that channel A is selected to receive the next base pulse, the incoming base pulse will provide a control for transistor 836. When the incoming channel A base pulse at resistor 754 is high, the inverter 808 will invert the signal and cause transistor 836 to cease conduction. This will permit capacitor 838 to charge from a constant current source developed through the emitter-collector circuit of a transistor 840. When signal on channel A goes high, the transistor 836 is turned on to lower the left side of capacitor 838 to ground. With the negative transistion of the left side of capacitor 838, the right side of capacitor 838 will also make the same transistion to cause the capacitor 838 to again charge from a constant current from the standard ECU on terminal 848. The right side voltage of capacitor 838 is fed to the base electrode of a transistor 846, the capacitor being supplied by the constant current source being supplied by the input conductor 848 connected to sense engine coolant temperature, $T_{H20}$, from the standard control unit. This current is a constant current, the magnitude being dependent on the temperature of the engine coolant. An identical multiplier exists below for channel B and the transistor corresponding to transistor 836 is designated transistor 856. The channel B pulse going positive causes transistor 856 to cease conduction thereby permitting capacitor 858 to charge from a constant current source created by transistor 860. When the pulse B goes to zero, the transistor 856 is turned on, causing a negative voltage transition of the left side of capacitor 858. This same negative transition is seen at the base of transistor 870, causing it to turn off until the constant current from the collector of transistor 862 recharges the right side of capacitor 858 back to about positive 0.6 volt, at which time transistor 870 conducts again, its collector voltage going to ground. The current in the collector of transistor 862 is dependent on engine coolant temperature. Thus, the recharge slope on the right side of capacitor 858, and the multiplier pulse width output, depends on engine coolant temperature. The output pulse duration is the time that transistor 870 is turned off.

Accordingly, an additional pulse is generated on conductors 686 or 688, the starting point of which depends on the base pulse and the duration of the pulse is proportional to coolant temperature. The pulse on conductor 688 is generated from the collector electrode of transistor 870.

In this regard, attention is directed to FIG. 21 wherein is illustrated the slope at the base of transistor 846, the transistor being designated Q15 in FIG. 21. The positive slope is seen to be proportional to engine temperature. The second diagram of FIG. 21 illustrates the output of the transistor 846, again designated Q15 at point C, point C being illustrated in the drawings. The following figure illustrates the A pulse relative to the operation of transistor 846 and the fourth figure represents the voltage at the collector of transistor 836. Accordingly, by correlating the various figures of FIG. 21, the operation of the transistors 836, 846, the charge and discharge of capacitor 838 and the output pulse at point C will be seen. This operation is similar for transistors 856 and 870 and capacitor 858.

The output of the transistor 846 is fed to the OR gate 630 and the output of transistor 870 is fed to OR gate 632. Specifically, the multiplier pulse is fed through a resistor 880 to the non-inverting input of an operational amplifier 882. The inverting input is connected to a source of positive potential. On the other hand, the collector voltage of transistor 870 is fed to the noninverting input of an operational amplifier 884 through a resistor 886. It will be seen that nodes 890 and 892 are summing nodes for channels A and B, respectively. Accordingly, the base pulse on conductor 658 is fed to the node 890 by means of a resistor 894 and the pulse from transistor 846 is also fed to the node 890 by means of resistor 880. The base pulse on conductor 660 is fed to node 892 through a resistor 896 and the collector signal of transistor 870 is fed to the node 892 by means of resistor 886.

It will be seen that the nodes 890 and 892 also include acceleration enrichment pulses fed to node 890 by means of a terminal 900 in the case of node 890 and to node 892 acceleration enrichment pulses are fed through a terminal 902. The node 890 is also fed a cold start pulse which is impressed on input terminal 656 from a cold start circuit in the standard electronic control. The pulse on terminal 656 is controlled by the Q pulse at input terminal 906. A similar situation exists wherein cold start pulses are fed to node 892 by means of terminal 656 and the pulses therein are controlled by an input signal fed to a Q input terminal 908.

Accordingly, the output of operational amplifier 882 will provide an output pulse to a current driver for the injectors any time one of the input pulses appears at node 890. Accordingly, a base pulse may be fed to terminal 890 and subsequently a multiplied pulse from transistor 846 fed to node 890. If acceleration enrichment is desired, then a pulse will be added to the end of a multiplier pulse by means of a pulse fed to terminal 900. If a cold start pulse is required, then the cold start pulse is fed to output terminal 910 through node 890 and operational amplifier 882, the cold start pulse being longer than the duration of the sum of the pulses previously described. The output pulse on terminal 910 is also fed to the electronic control unit connected to terminal 916 through a diode 918. The channel B circuit is identical and need not be explained further here.

The signal on conductor 916 is utilized for system initialization when energy is applied to the standard control unit (ECU), the terminal 916 is momentarily grounded to ensure that no pulses appear at terminals 910 or 920 which would thereby inject an uncontrolled pulse of fuel into the engine.

Referring now to FIG. 22, the signal levels on conductors 686 and 688 are fed to a pair of inverter circuits 930, 932. Accordingly, every time that the pulse level on either conductor 686 or 688 goes from a high to a low level, the output of inverters 930 or 932, respectively, will go from a low to high level. Accordingly, on the rising edge of the output of inverter 930, an output spike will be produced across resistor 934 due to the differentiation action of capacitor 936. Similarly, a rising edge signal at the output of inverter 932 will create a positive spike across resistor 938 due to the action of capacitor 940. These rising spikes are fed to a summing node 944, which in turn control the conduction of a transistor 948. The output of transistor 948 may or may not produce an acceleration enrichment pulse depending on other conditions to be discussed hereinafter.

The throttle position is sensed by means of an analog potentiometer which provides an input signal at an input terminal 950. This analog signal is fed to an operational amplifier 954 appearing on capacitor 956. Accordingly, the voltage at the input of operational amplifier 954 will be approximately the potentiometer voltage at input terminal 950 but shifted up slightly. This voltage causes transistor 960 to conduct and provide a current through resistor 962 which is corresponding to the throttle position sensed at input terminal 950. A mirror-current circuit 964 is provided whereby the current through transistor 966, which is also the current through transistor 960, is induced in the emitter-collector path of a transistor 968. Accordingly, the emitter-collector current of transistor 968 is utilized to charge the capacitor 970 through a conductor 972.

Referring now to the operation of a comparator 976, it will be seen from a description below that the comparator 976 generates an acceleration enrichment pulse. The charge on capacitor 970 is fed to the inverting input of comparator 976 through a resistor 978. Normally, this input voltage is kept slightly above the voltage at the non-inverting input so that the output of comparator 976 is kept in the low state. This is true even when capacitor 970 is discharged to ground which occurs when transistor 948 commences conduction each time a positive spike is generated at node 944.

However, the non-inverting input to comparator 976 is rendered throttle position rate of change responsive in that a differentiator network is provided which includes a resistor 980 and a resistor 982 and and a capacitor 984. The throttle position rate of change is fed to the differentiator circuit from input conductor 670, the signal level thereon being representative of the instantaneous throttle position. If there is a transient, indicating that the throttle is being moved forward, the voltage at the non-inverting input to the comparator 976 will rise. If the non-inverting input is at a higher voltage when the normal pulse terminates, as sensed by the spike a node 944 thereby discharging capacitor 970, the comparator will provide output at output conductor 990. Resistor 992 is provided as a hysteresis resistor to preclude the comparator from oscillating.

The output pulse duration at conductor 990 is determined by the rate of change of the throttle position as indicated by the magnitude of the signal at the non-inverting input to comparator 976. Also, because the capacitor 970 will start to charge upon termination of the spike at node 944, and the charge rate of capacitor 970 is determined by the throttle position, the output pulse width is also dependent on throttle position. Accordingly, if the magnitude of the input at the non-inverting terminal is high and the throttle position is low, the output duration at conductor 990 will be long.

As noted above, the output acceleration enrichment pulse is corrected for temperature by means of the circuit 676. The TP$_{AE}$ pulse is inverted by means of an inverter 996, the output of which is fed to the base electrode of a transistor 998 through a resistor 1000. The circuit illustrated at 676 is similar to the multiplier described above in conjunction with the description of FIG. 20. Accordingly, when the base electrode of transistor 998 goes low, a capacitor 1002 is charged from a source of voltage through a resistor 1003. A zener diode 1006 is provided to keep the collector voltage of transistor 998 from exceeding a preselected value. When the base electrode of transistor 998 goes high, the left side of capacitor 1002 has a negative transistion which causes a corresponding negative transistion on the right side of capacitor 1002. The capacitor then commences charging from a current source made up of a transistor 1110 and its emitter resistor, the current through the transistor 1110 being dependent on the temperature of the vehicle coolant. Accordingly, the source for charging capacitor 1002 from transistor 1110 will be temperature dependent. This current feeds the base of transistor 1112 and the collector of transistor 1112 will remain in a high or off state until the base electrode circuit charges back up to a voltage sufficient for conduction of transistor 1112. This time duration is dependent on the width of the input pulse fed to transistor 998 and the temperature of the engine coolant as sensed by transistor 1110.

The pulse generated at the collector of transistor 1112 and fed to the output conductor 662 through diode 1114 is added to the pulse being fed directly from conductor 990 to conductor 662 through a diode 1116, increasing the width of the acceleration enrichment pulse depending on coolant temperature.

The system also includes a wide-open throttle signal which is generated by circuit 694 which includes an operational amplifier 1120, the noninverting input of which receives an analog signal dependent on the throttle position through a resistor 1122. Accordingly, the signal level at output conductors 696 switches to a high state at a sensor voltage corresponding to wide-open-throttle. This signal is fed to the ECU.

Figure 23:
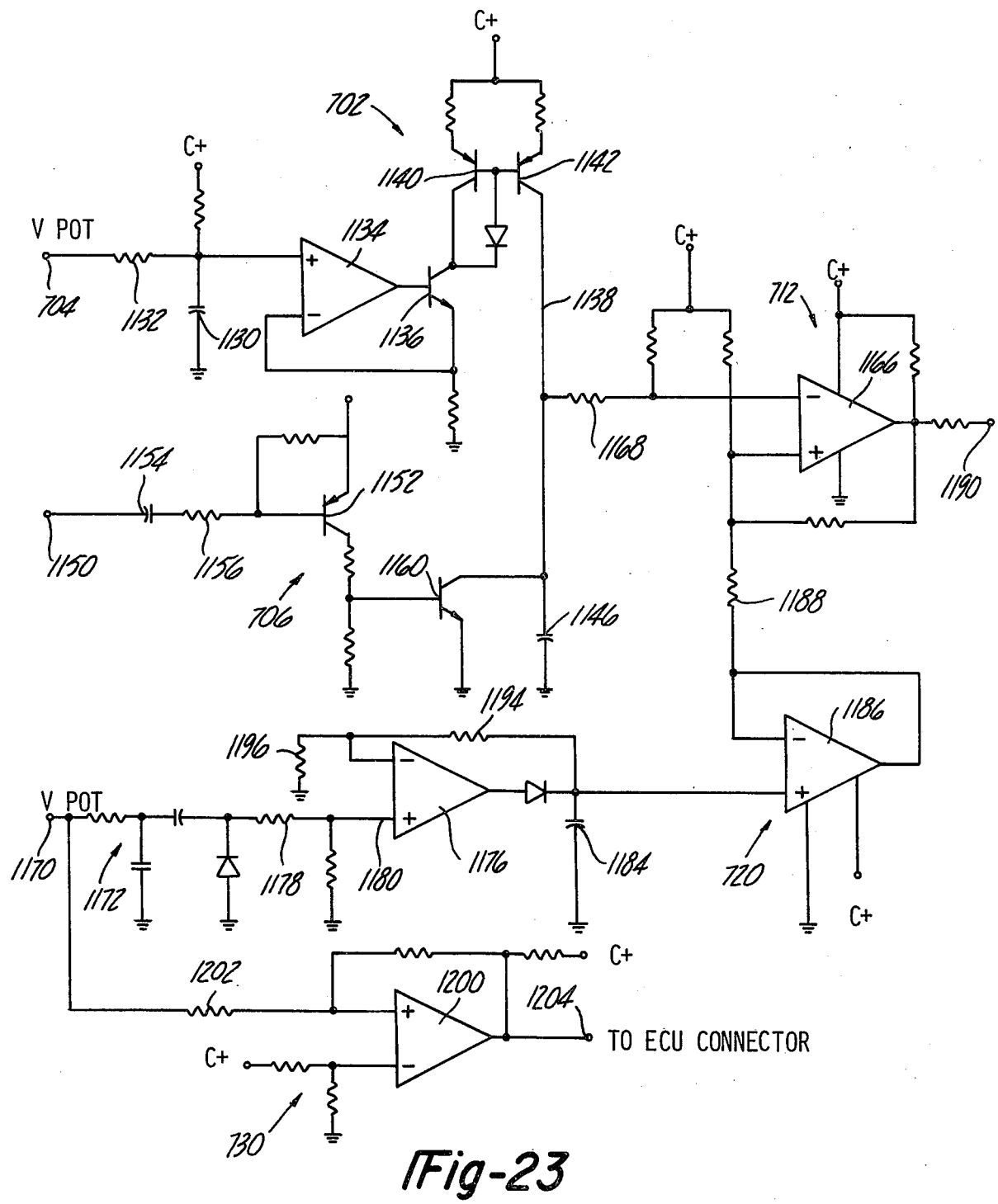
FIG. 23 is a schematic diagram illustrating the details of the block diagram illustrated in FIG. 19.

Referring now to FIG. 23, there is illustrated a modified form of the circuit described in conjunction with the description of FIG. 22. Specifically, the coolant temperature compensation circuit is eliminated and the warm-up factors generated in the standard electronic control unit to increase the width of the base pulse are utilized to correct the acceleration enrichment pulse width according to engine coolant temperature. The acceleration enrichment pulse generated by the circuit of FIG. 23 is then added to the base pulse width in conjunction with FIG. 20 and the sum of the two pulses is operated on by the multiplier to produce the final output TP pulse. Additionally, the circuit of FIG. 23 provides a transient decay function which maintains the acceleration enrichment pulse on a decay function basis after the end of the throttle position transient.

Referring to the specific details of FIG. 23, the voltage from the throttle position potentiometer is fed to the input terminal 704 to charge a capacitor 1130 through a resistor 1132. The voltage level at input terminal 704 creates a charge on capacitor 1130 which is fed to an operational amplifier 1134. The output of the operational amplifier controls the conduction of a transistor 1136, the current through the collector-emitter circuit of transistor 1136 being reflected in the current flowing in a conductor 1138. This is due to the fact that the current flowing in the collector-emitter circuit of transistor 1136 is substantially the same current that is flowing in a transistor 1140. The conductive level of transistor 1140 is reflected to the emitter-base circuit of a transistor 1142 to cause transistor 1142 to conduct to the same degree that transistor 1136 is conducting.

Thus, a current flows in conductor 1138 to charge a capacitor 1146 with a current supply which is directly proportional to the throttle position sensed at input terminal 704. The normal running base pulse generated in the ECU is fed to input terminal 1150, the termination of the normal running base pulse causing transistor 1152 to conduct momentarily due to the differentiation action of a capacitor 1154 and a resistor 1156. The conduction of transistor 1152 will cause a transistor 1160 to conduct thereby momentarily discharging capacitor 1146. Accordingly, if the circuit of FIG. 23 is to provide an acceleration enrichment pulse, the pulse will be initiated at the end of the normal running base width. The charge on capacitor 1146 is fed to the inverting input of an output operational amplifier 1166 through a resistor 1168.

The operation of the comparator 1166 is substantially identical to the operation of the output comparator described in conjunction with FIG. 22. Referring now to the lower half of FIG. 23, the throttle position signal is being fed to an input terminal 1170 and from there through a low pass filter circuit 1172 and differentiator circuit 1173 to provide a voltage proportional to the rate of change of throttle position at the non-inverting input of an operational amplifier 1176 by means of a resistor 1178 and a conductor 1180. The output of the operational amplifier is utilized to charge a capacitor 1184, the charge on capacitor 1184 being fed through an operational amplifier 1186 and, then, to the non-inverting input of operational amplifier 1166 by means of a resistor 1188. The operational amplifier 1166 is set up such that when there is no transient signal being passed through resistor 1188, the voltage on the non-inverting input to comparator 1166 is below the lowest voltage appearing at the inverting input. However, if a transient has occurred, the voltage input to the non-inverting portion of comparator 1166 is greater than the voltage at the inverting input to provide an output pulse at an output terminal 1190. The output pulse at terminal 1190 is the acceleration enrichment pulse described above.

The duration of the pulse at terminal 1190 will be determined by the rate of charge of capacitor 1146 and the magnitude of the rate of change of throttle position as fed to the non-inverting input of comparator 1166.

As stated above, the charge on capacitor 1184 during the transient of the throttle is determined by the magnitude of the rate of change of throttle position. The capacitor 1184 does not immediately discharge when the transient condition ceases to exist but rather discharges slowly through the discharge circuit including resistor 1194 and resistor 1196. Thus, the signal being fed to the non-inverting input of comparator 1166 is maintained after the transient has ceased to exist. In this way, a decay function is provided after the cessation of the transient condition.

The circuit of FIG. 23 also includes a wide-open throttle signal which is generated by a wide-open throttle comparator circuit 730 including an operational amplifier 1200, the non-inverting input of the operational amplifier being fed a throttle position signal through a resistor 1202. The output of the operational amplifier 1200 is fed to the electronic control unit connected to output terminal 1204.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

I claim:

1. In a fuel management system, for an internal combustion engine having a source of fuel supply, throttle body means mounted on the engine having throat means for delivering fuel to the engine, and pump means for delivering fuel from the supply to the engine, a fuel accumulator, control and regulating assembly comprising fuel bowl means formed in the throttle body means having a fuel accumulating cavity integrally formed therein and an inlet connecting said cavity to the pump means for receiving fuel from the pump means, said fuel bowl means having an outlet formed therein communicating said cavity with the throat means, injector means disposed in said cavity and contiguous with said outlet for controlling the flow of fuel in a pulsed fashion from said cavity to the throat means, and inlet metering regulator means positioned in said cavity and contiguous with said inlet for controlling the flow of fuel into said cavity and regulating the pressure of the fuel in said fuel accumulating cavity, said inlet metering regulating means including a valve seat and a valve assembly having a valve stem and valve head affixed thereto, said valve head being mateable with said valve seat, and diaphragm means connected to said valve stem and closing said fuel bowl, the pump providing pressurized fuel to said cavity through said inlet, spring means urging said diaphragm means toward said valve seat, said fuel pressure moving said diaphragm means against the urging of said spring away from said valve seat and said valve head toward engagement therewith.

2. The improvement of claim 1 wherein said inlet includes passageway means formed in the throttle body means in fluid communication with said cavity, said valve means further including an orifice formed therein, said valve seat closing said communication except for said orifice.

3. The improvement of claim 2 wherein said valve seat is formed on the opposite side of said valve means from said cavity.

4. The improvement of claim 3 further including purging conduit means communicating said cavity with the source of fuel supply for purging vapor from said cavity to the supply.

5. The improvement of claim 3 wherein said valve means is formed as a plug fixedly engaging said passageway means, said plug including means forming a central, axially extending aperture which is said orifice, said valve stem extending through said aperture and said valve head being on the opposite side of said aperture from said diaphragm means.

6. The improvement of claim 5 wherein said valve seat is formed within said aperture forming means.

7. The improvement of claim 6 wherein said regulating means includes said spring means engaging said diaphragm means on the opposite side thereof from said cavity for urging said valve head away from said valve seat, and resilient means engaging said valve head to urge said valve head into engagement with said valve seat.

8. The improvement of claim 1 wherein said diaphragm means is moved in response to a pressure differential across said diaphragm means, said diaphragm acting with said cavity to form an accumulator for said fuel.

9. The improvement of claim 8 wherein the pump means is of the type having a cycle including an intake and a pressure portion of the cycle, said fuel controlling means flowing fuel to the throat during the intake portion of the cycle, movement of said diaphragm maintaining substantially constant pressure of the fuel during the intake portion of the cycle.

10. The improvement of claim 9 further including housing means closing said open end of said cavity and said housing means for forming a fluid seal therebetween.

* * * * *